US009440219B2

United States Patent
Böhringer et al.

(10) Patent No.: US 9,440,219 B2
(45) Date of Patent: *Sep. 13, 2016

(54) FILTER MATERIALS FOR TREATING AND PURIFYING GAS

(75) Inventors: Bertram Böhringer, Wuppertal (DE); Ilsebill Eckle, Gelsenkirchen (DE); Peter Wasserscheid, Erlangen (DE); Daniel Roth, Erlangen (DE)

(73) Assignees: Blücher GmbH, Erkrath (DE); Friedrich-Alexander-Universität Erlangen-Nürnberg, Erlangen (DE)

( * ) Notice: Subject to any disclaimer, the term of this patent is extended or adjusted under 35 U.S.C. 154(b) by 98 days.

This patent is subject to a terminal disclaimer.

(21) Appl. No.: 14/238,951

(22) PCT Filed: May 25, 2012

(86) PCT No.: PCT/EP2012/002243
§ 371 (c)(1),
(2), (4) Date: May 30, 2014

(87) PCT Pub. No.: WO2013/023714
PCT Pub. Date: Feb. 21, 2013

(65) Prior Publication Data
US 2015/0093310 A1      Apr. 2, 2015

(30) Foreign Application Priority Data

Aug. 14, 2011 (DE) .......... 10 2011 110 102
Sep. 23, 2011 (DE) .......... 10 2011 114 132

(51) Int. Cl.

| C01B 31/08 | (2006.01) |
|---|---|
| B01J 20/22 | (2006.01) |
| B01J 20/20 | (2006.01) |
| B01D 53/02 | (2006.01) |
| B01J 20/28 | (2006.01) |
| B01J 20/32 | (2006.01) |
| B01D 53/04 | (2006.01) |

(52) U.S. Cl.
CPC .......... *B01J 20/223* (2013.01); *B01D 53/02* (2013.01); *B01D 53/04* (2013.01); *B01J 20/20* (2013.01); *B01J 20/2808* (2013.01); *B01J 20/28066* (2013.01); *B01J 20/28073* (2013.01); *B01J 20/28083* (2013.01); *B01J 20/3204* (2013.01); *B01J 20/3287* (2013.01); *C01B 31/08* (2013.01); *B01D 2239/0464* (2013.01); *B01D 2253/102* (2013.01); *B01D 2253/1122* (2013.01); *B01D 2253/25* (2013.01); *B01D 2253/306* (2013.01); *B01D 2253/308* (2013.01); *B01D 2253/31* (2013.01); *B01D 2253/311* (2013.01); *B01D 2253/342* (2013.01); *B01D 2259/4508* (2013.01)

(58) Field of Classification Search
CPC .................. C01B 31/08; B01D 2239/0464
See application file for complete search history.

(56) References Cited

U.S. PATENT DOCUMENTS

| 2010/0313759 A1 | 12/2010 | Bones |
|---|---|---|
| 2013/0030233 A1 | 1/2013 | Boeing |

FOREIGN PATENT DOCUMENTS

| CN | 102107134 | 6/2011 |
|---|---|---|
| CN | 101928394 | 8/2012 |
| DE | 102007062667 | 5/2009 |
| DE | 102009029284 | 3/2011 |
| JP | 2005518465 | 6/2005 |
| JP | 2009214094 | 9/2009 |
| WO | 03072498 | 9/2003 |
| WO | 2011029691 | 3/2011 |
| WO | 2012046057 | 4/2012 |

OTHER PUBLICATIONS

Jyri-Pekka Mikkola, Pasi Virtanen, Hannu Karhu, Tapio Salmi, and Dmitry Yu. Murzin, Supported Ionic Catalysts for Fine Chemicals: Citral Hydrogenation, The Royal Society of Chemistry 2006.
Pasi Virtenen, Hanu Karhu, Geza Toth, Krisztian Kordas, and Jyri Mikkola, Toward One-Pot Synthesis of Methods From Citral: Modifying Supported Ionic Liquid Catalysts (SILCAs) with Lewis and Bronsted Acids, journal of Catalysis, 2009.
Florian Kohler, Dnaiel Roth, Esther Kuhlman, Peter Wassercheid, and Marco Haumann, Contagious Gas-Phase Desulfurisation Using Supported Ionic Liquid Phase (SILP) Materials, Green Chemistry, 2010.
Dae Jung Kim and Jae Eui Yie, Role of Copper Chloride on the Surface of Activated Carbon in Adsorption of Methyl Mercapta, Journal of Colloid and Interface Science, 2004.

*Primary Examiner* — Stuart Hendrickson
(74) *Attorney, Agent, or Firm* — Edward E. Sowers; Brannon Sowers & Cracraft PC

(57) ABSTRACT

The invention relates to a filter material which is used, in particular in filters or as a filter for treating and/or purifying gas, in particular for clean room environments. The filter material comprises at least one activated carbon, in particular with reactive and/or catalytic finishing and the activated carbon is present in the form of discrete activated carbon particles, preferably in a spherical and/or grain form. The activated carbon comprises and/or is provided with at least one metal component which contains at least one metal-containing ionic liquid (IL), containing in particular metal ions, preferably based on a metal compound.

19 Claims, 4 Drawing Sheets

FILTER MATERIALS FOR TREATING AND PURIFYING GAS

CROSS-REFERENCES TO RELATED APPLICATIONS

This application is a National Stage filing of International Application PCT/EP2012/002243, filed May 25, 2012, claiming priority to German Applications No. DE 10 2011 110 102.4 filed Aug. 14, 2011, and No. DE 10 2011 114 132.8 filed Sep. 23, 2011, entitled "FILTER MATERIALS FOR TREATING AND PURIFYING GAS" The subject application claims priority to PCT/EP2012/002243, and to German Applications No. DE 10 2011 110 102.4 and DE 10 2011 114 132.8 and incorporates all by reference herein, in their entirety.

BACKGROUND OF THE INVENTION

The present invention relates to novel concepts for gas treatment and gas cleaning, in particular for cleanroom conditions.

More particularly, the present invention relates to a filter material useful in particular in filters or as a filter for gas treatment and/or gas cleaning, in particular for cleanroom conditions, and also to methods of producing said filter material and also of using said filter material.

The present invention finally relates to a method of cleaning/conditioning gases by using the filter material of the present invention.

A cleanroom in the context of the present invention is a very clean room in which the concentration of airborne corpuscles and noxiant gases is kept as low as necessary. Such cleanrooms or very clean rooms are needed for special methods of fabrication particularly in semiconductor fabrication/technology—where particles and gases found in ordinary ambient air would disrupt the particular methods. In semiconductor fabrication in particular, particles just a few nanometers in size can disrupt the structuring of integrated circuits; it is similarly possible for disruptive/oxidizing gases, e.g., oxides of sulfur and of nitrogen, hydrogen sulfide, ammonium, halogens, hydrogen halides, etc., which are ever present in the atmosphere, to disrupt/impair such fabrication processes (e.g., misdoping of semiconductors, etc.).

Further applications of cleanrooms and/or cleanroom technology are found in optics and laser technology, aerospace technology, the biosciences and medical research and treatment, the research and germ-free manufacture of foods and medicaments and in nanotechnology.

Cleanrooms of this type are generally designed such that the number of airborne corpuscles introduced into or possibly formed in the room can be kept as low as possible. Various filtering devices equipped with particle filters appropriate to the particle size are used for this purpose. Depending on the field of application, the requirements as to the maximum number of corpuscles/particles in the cleanroom or very clean room can vary. There may be an additional provision to control, for example, not just the particle count but also the number of germs, which is needed in the manufacture of pharmaceutical products or products of the food industry in particular. Other parameters, such as temperature, humidity and pressure, are generally likewise kept constant to create comparable conditions at all times.

A central aspect for the provision of cleanrooms is represented by the flow principles of the room air to be filtered to minimize corpuscles and/or germs and/or noxiant gases.

In general, cleanroom technologists distinguish between a turbulent diluting flow and low-turbulence displacing flow. In the turbulent diluting or mixing flow, the filtered clean air is introduced into the cleanroom in turbulent fashion and thereby produces a monotonous dilution of the particle/noxiant gas concentration. However, it must be borne in mind here in particular that objects and processes which generate particles and noxiant gas are eliminated in the cleanroom. In the low-turbulence displacing flow, which is also known as laminar flow, the clean air flows into the cleanroom in a low-turbulence manner and generally vertically and has the effect that the vulnerable workspaces and machines are contaminated as little as possible. The air then escapes from the room on the opposite side, generally through a perforate double floor and is returned to the air circulator for repeated filtering.

Owing to the different levels of cleanroom requirements, the various fields of application have their own cleanroom classes and standards regulating their adherence, in particular for cleanrooms used in microelectronics. For instance, semiconductor technology is governed by ISO standard 14644-1, which provides classes from ISO 1 to ISO 9, where ISO 1 is the class having the highest requirements with regard to cleanness.

Various methods are employed to meet the particular requirements of the particular field of application and to prevent unwanted particles and noxiant gases and/or the particular main contaminants being able to pass into the air and to remove particles and noxiant gases already present in the air.

Numerous filters and/or filter materials are known from the prior art as being potentially useful for the filtration of air from cleanrooms.

Filters and/or filter materials used in particular in the prior art, in particular for reducing the concentration of noxiant gases, are based on activated carbon and are generally endowed with suitable impregnants for the activated carbon, since the sorptive properties of the activated carbon may otherwise often be insufficient.

One disadvantage of the customarily used activated carbon filter materials, however, is that even with suitable impregnation the adsorptive performance is insufficient at very low levels of noxiants/gases to be removed, since adsorption often only ensues beyond a certain threshold value. As a result, low levels of undesirable noxiants and gases can in this way "slip" through the filter materials and cause undesirable contamination of the cleanroom atmosphere.

Sulfur- and nitrogen-containing gas and noxiant materials, such as oxides of sulfur and of nitrogen, ammonia, hydrogen sulfide, etc., are removed using specifically iodide-impregnated adsorbents, in particular iodide-impregnated activated carbons, by the iodide impregnation reacting with the gas and noxiant materials to be removed and in the course of this reaction being partly converted into elemental iodine which, after a certain in-service period of the filters and/or filter materials, can escape/desorb from the activated carbon, so the cleanroom atmosphere becomes undesirably contaminated with iodine.

WO 01/70391 A1, for instance, proposes the use of a filter material having adsorbing properties which includes a carrier layer as well as a plurality of adsorbing layers. It is provided therein that the filter material shall include not only at least one adsorbing layer based on an impregnated activated carbon material but also at least one adsorbing layer based on ion exchange materials. The impregnation contemplated for the activated carbon material is in particular an impregnation with metals from the group of copper, iron, nickel, zinc, chromium, cobalt, ruthenium or osmium. The impregnation of and for the activated carbon material is relatively cost-intensive. Impregnation is further not always efficient in that, more particularly, some of the noxiants can be freed again by desorption processes. Moreover, slippage at low noxiant/gas concentration is relatively high.

DE 196 30 625 A1 further proposes a method of extracting impurities from a gas. It is provided therein that a gas stream containing water vapor is passed through solid sodium iodide to trap/bind the contaminants through formation of sodium iodide hydrate. The sodium iodide can be in the form of finely granular sodium iodide powder, in the form of a coating on a carrier material or in the form of a porous solid sintered body. However, the sorption or reaction of acidic or oxidizing gases, especially sulfur- or nitrogen-containing oxides, hydrogen sulfide or the like, can cause significant amounts of elemental iodine to be formed and released into the atmosphere in the course of operation, leading to an undesirable contamination of the ambient atmosphere. Moreover, the initial adsorptive performance is unsatisfactory, in particular at low levels of noxiants/gases to be adsorbed.

BRIEF SUMMARY OF THE INVENTION

It is an object of the present invention to provide filter materials suitable, in particular, for use in filters or as filters for gas treatment and/or gas cleaning, in particular for cleanroom conditions, and corresponding methods of production, while seeking to at least substantially avoid or alternatively at least ameliorate the above-described disadvantages of the prior art.

What is sought in particular in the context of the present invention is to provide an activated carbon base filter material suitable, in particular, for use in filters or as filters for gas treatment and/or gas cleaning, in particular for cleanroom conditions, wherein the activated carbon shall exhibit a reactive/catalytic enhancement and wherein, more particularly, the efficacy of the employed activated carbon in respect of the removal/sorption of gaseous noxiants or the like shall be further improved over the prior art. More particularly, the present invention seeks to provide a filter material which ensures that the adsorptive properties of the activated carbon present therein are not adversely affected by the specific reactive/catalytic enhancement. The present invention additionally seeks to provide efficient methods based on which the filter material of the present invention can be obtained.

As Applicants have now found, in a completely surprising manner, the above-indicated object underlying the present invention is unexpectedly achieved when filter material comprising an activated carbon is provided in the context of the present invention, wherein the activated carbon, in the form of discrete activated carbon particles, is enhanced/endowed with a specific metallic component, wherein the metallic component comprises at least one metal-containing ionic liquid (IL) containing in particular metal ions, preferably based on a metal compound. In other words the fundamental concept of the present invention consists in providing an activated carbon based filter material wherein the metallic component which determines the reactive/catalytic properties of the activated carbon is provided with and/or utilizes an ionic liquid (IL) incorporating a metal, in particular in ionic form on the basis of a metal compound (such as a metal salt) which is soluble and/or dissociable in the ionic liquid (IL), wherein the activated carbon is enhanced/impregnated with such a metallic component/ionic liquid (IL) in a purpose-directed manner.

To achieve the object defined above, the present invention accordingly proposes—in accordance with a first aspect of the present invention—a filter material as claimed in claim 1 of the present invention. Further, specifically advantageous versions of the filter material according to the present invention are subject matter of respective dependent claims.

The present invention further provides—in accordance with a second aspect of the present invention—the methods of producing the filter material of the present invention which are claimed in independent method claims according to the present invention. Further, specifically advantageous versions of the methods according to the present invention are subject matter of respective dependent method claims.

The present invention still further provides—in accordance with a third aspect of the present invention—the uses according to the present invention which are recited herein.

The present invention finally further provides—in accordance with a fourth aspect of the present invention—a method of cleaning/conditioning gases as described herein. Further, specifically advantageous forms of that method according to the present invention which relates to this aspect of the present invention are similarly provided.

It will be readily understood that, in the hereinbelow following description of the present invention, such versions, embodiments, advantages or examples or the like, as recited hereinbelow in respect of one aspect of the present invention only, for the avoidance of unnecessary repetition, self-evidently also apply mutatis mutandis to the other aspects of the present invention without the need for an express mention.

It will further be readily understood that any values, numbers and ranges recited hereinbelow shall not be construed as limiting the respective value, number and range recitations; a person skilled in the art would appreciate that in a particular case or for a particular use, departures from the recited ranges and particulars are possible without leaving the realm of the present invention.

In addition, any hereinbelow recited value/parameter particulars or the like can in principle be determined/ascertained using standardized or explicitly recited methods of determination or else using methods of determination/measurement which are per se familiar to a person skilled in the art.

As for the rest, any hereinbelow recited relative/percentage, specifically weight-based, recitations of quantity must be understood as having to be selected/combined by a person skilled in the art within the context of the present invention such that the sum total—including where applicable further components/ingredients, in particular as defined hereinbelow—must always add up to 100% or 100 wt %. But this is self-evident to a person skilled in the art.

Having made that clear, the present invention will now be more particularly described.

DETAILED DESCRIPTION OF THE INVENTION

Figure 1:
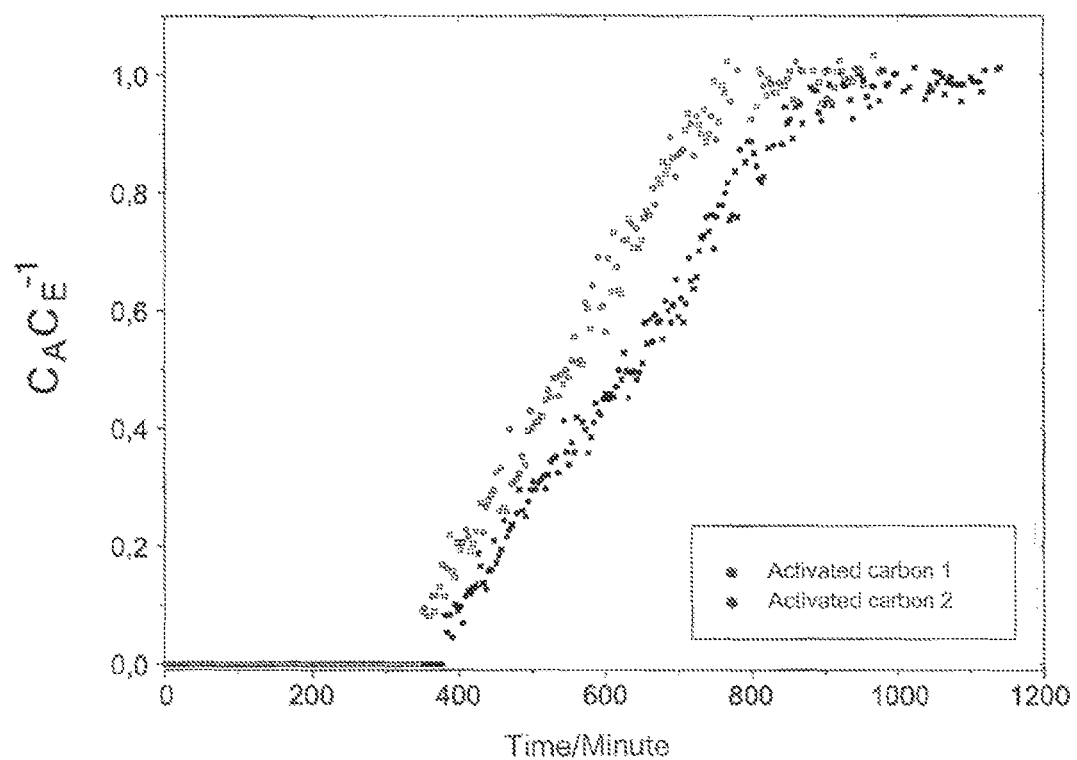
FIG. 1 provides a graphical depiction of the breakthrough curves of ammonia ($NH_3$) for beds of an activated carbon used according to the present invention (activated carbon 1) and including a metallic component comprising a metal-containing ionic liquid (IL) in comparison with a noninventive activated carbon (activated carbon 1') conventionally impregnated with metal salt.

In a first aspect of the present invention, the present invention relates to a filter material, suitable in particular for use in or as a filter for gas treatment and/or gas cleaning, in particular for cleanroom conditions, wherein the filter material comprises and/or includes or consists of at least one activated carbon, in particular activated carbon with reactive and/or catalytic enhancement, wherein the activated carbon is in the form of discrete activated carbon particles, preferably in spherical and/or granular form, wherein the activated carbon is enhanced and/or endowed with at least one metallic component, wherein the metallic component comprises at least one metal-containing ionic liquid (IL) containing in particular metal ions, preferably based on a metal compound.

As mentioned, the fundamental concept of the present invention thus consists in the specific use of an ionic liquid (IL) which contains metals/metal ions, preferably at least one metal compound, for enhancing an activated carbon with a metallic component in order thereby to provide an activated carbon having reactive and/or catalytic properties, the method of enhancing the activated carbon with the metallic component taking in particular the form of a coating/wetting/impregnation of the activated carbon with the metal-containing ionic liquid (IL). In this context, it is preferably not only the outer but also the inner surficial structure including the related pores, in particular micro-, meso- and/or macropores, of the activated carbon which are at least partially and/or portionally in contact/at least partially wetted/impregnated with the metal-containing ionic liquid (IL) and thus with the metallic component. It is believed, without wishing to be tied to this theory, that the metal-containing ionic liquid (IL)/the metallic component forms on the activated carbon surface so to speak a reactive/catalytic layer having chemisorptive and/or physisorptive properties which supplement/complement the physisorptive properties of the activated carbon.

This fundamental concept of the present invention is the basis for providing in an utterly surprising manner a novel filter material according to the invention by making use of this activated carbon which has outstanding properties in respect of the sorption of a very wide variety of noxiants to be removed or a very wide variety of disruptive and occasionally toxic gases.

The concept of the present invention, according to which the metallic component used comprises a metal-containing ionic liquid (IL), containing in particular metal ions, preferably based on a metal compound, is the foundation for the present invention achieving a particularly homogeneous/uniform enhancement/impregnation of the activated carbon—and this specifically across the full spectrum of pores—since the ionic liquid (IL) which contains a metal or to be more precise metal ions is particularly good at penetrating into the pore system to ensure uniform wetting therein of the pore surface. What makes the present invention utterly surprising is that the pore system of the activated carbon is left unaffected (or at least essentially not adversely affected) with regard to the adsorption, in particular physisorption, of noxiants. In other words, the activated carbon used according to the present invention has a high BET surface area amenable to the adsorption of noxiants, in particular by physisorption, even after enhancement with the metallic component, so the fundamental properties of the activated carbon as such survive the enhancement with the metallic component, and this was unforeseeable.

The activated carbon used in the filter material of the present invention (and hence also said filter material as such/as a whole) accordingly combines chemisorptive and physisorptive properties in one material and, unlike nonimpregnated activated carbon or else conventionally impregnated activated carbon, is able to also bind the sorbates (i.e., the substances to be sorbed) reliably and irreversibly/durably.

In addition, the manner in which the present invention enhances/impregnates the activated carbon with the metallic component prevents crystals/crystallites forming in the pore system in a way which is a frequent occurrence in the prior art—by metal salts crystallizing out, for example—and leads to blockages of the pore system, since, first, the metals/metal compounds used are durably dissolved/dissociated in the ionic liquid (IL) and, secondly, the very specific physicochemical properties of the ionic liquid (IL) mean that it durably remains in the liquid state on the surface of the outer and inner structures of the activated carbon and so counteracts crystallization processes. In contrast to the metal salt impregnation customary in the prior art, the present invention prevents even in the case of a highly microporous activated carbon the occurrence of blockages in respect of the pore structure of the activated carbon, still further improving the performance of the activated carbon used in the filter material of the present invention.

Similarly, the particularly homogeneous/uniform enhancement/impregnation of the activated carbon used in the filter material of the present invention with the metal-containing ionic liquid (IL) which is determinative of the reactive/catalytic enhancement, and which contains metal ions in particular, in the manner of a wetting layer of liquid serves to improve the performance of the activated carbon used according to the present invention with regard to the sorption/degradation of substances to be removed, in particular since the activated carbon used according to the present invention has, across a large proportion of its surface, combined physisorption and chemisorption properties which, moreover, reinforce each other beyond the sum total of their individual effects, which has to be taken as evidence for the existence of a synergistic effect.

This is because, as is surprisingly shown by studies conducted on the part of Applicants, the use of metal compounds/metal salts in the context of ionic liquids (IL) is distinctly more efficient than the conventional use of metal salts in the form of crystals/solid bodies in that, without wishing to be tied to this theory, first, any blockage of pore systems in the activated carbon is efficiently counteracted, as the catalytic/reactive system is used in the form of a liquid. Secondly, the use of ionic liquid (IL) like a kind of solvent/liquid vehicle for the metals/metal compounds used leads via optimized diffusive processes to a beneficial distribution in the activated carbon system of the substances to be sorbed, which similarly improves their sorption.

According to the present invention, therefore, the metallic component which is based on the ionic liquid (IL) plus the metal/metal compound and is determinative for the reactive/catalytic enhancement, and the particulate activated carbon impregnated/enhanced therewith are complementary to each other in a special manner.

The present invention provides in effect an optimized adsorptive system having combined and complementary physisorptive and chemisorptive properties.

What is utterly surprising in the context of the present invention is that activated carbon as such can be effectively enhanced at all with a metallic component by using an ionic liquid (IL), since activated carbon as such has generally hydrophobic properties, which is generally an obstacle to efficient wetting/impregnation. Yet the particular, and utterly surprising and unforeseeable, accomplishment due to the special procedure of the present invention is to endow activated carbon as such (even without pretreatment) with that metallic component by using an ionic liquid (IL), obtaining the above-recited positive properties with regard to the sorption of noxiants. The fact that is advantageous in this regard is that activated carbon as such—in contradistinction to conventional carrier materials—has at most only a low degree of polar or functional groups, to be precise essentially no polar or functional groups, which could interact in an undesirable manner with the metallic component, i.e., the metal and/or the ionic liquid (IL). In contradistinction to activated carbon as used in the present invention, conventional carrier materials, such as alumina, silica or other mineral oxides, often have acidic or basic groups which can reduce the activity of the component used, and this is not the case with activated carbon.

In summary, therefore, the activated carbon enhanced according to the present invention has outstanding adsorptive properties based on combined physisorption and chemisorption, while at the same time there is a significantly reduced tendency for sorbed substances to desorb—in contradistinction to conventional activated carbon. More particularly, the frequent occurrence with conventional activated carbon of previously sorbed substances desorbing or escaping again, for example in the event of exhaustion or excessive loading, is virtually or completely absent from the activated carbon used according to the present invention. The concept of the present invention to provide an activated carbon which has reactive/catalytic properties as well as its inherent adsorptive properties ensures a durable and generally irreversible binding and an efficient degradation of sorbed substances, which leads equally to a reduced desorption of those substances and to an increase in total adsorptive capacity.

More particularly, the filter material of the present invention—unlike the prior art—has outstanding sorptive properties at all times particularly with a view to reducing the concentration of noxiant gases: One advantage of the filter material according to the present invention is in particular that adsorption is sufficient even at very low levels of noxiants/gases to be removed, since adsorption ensues immediately and without delay, i.e., does not have to be triggered by a certain threshold value. Therefore, even low levels of undesirable noxiants and gases are removed by the filter material of the present invention, i.e., slippage is avoided. This has special significance for the achievement of cleanroom atmospheres.

The filter material of the present invention binds the sorbed substances durably, in particular irreversibly, desorption being generally insignificant and/or significantly less than with conventional activated carbon. Without wishing to be tied to any one theory, it is believed that this phenomenon can in some instances be explained by the irreversible formation of complexes and/or binding in the ionic liquid (IL). Therefore, no egress of iodine is observed even when iodide-containing impregnating systems are used.

The activated carbon used in the filter material of the present invention is generally useful, for example, for gas adsorption and in particular for adsorption of sulfur-containing gases (such as sulfur oxides and/or hydrogen sulfide), nitrogen-containing gases (such as nitrogen oxides and/or nitrogen hydrides such as ammonia) and halogen-containing gases (such as halogens, hydrogen chloride gas, etc.). The activated carbon used in the filter material of the present invention is equally also useful for adsorption of halogens as such, in particular in the form of gases or vapors, for example iodine vapors or the like. For this reason, too, the activated carbon used in the filter material of the present invention is useful, for example, particularly also for the clean-up/provision of cleaned air for cleanrooms or the like.

More particularly, the activated carbon used in the filter material of the present invention has particularly good properties with regard to the sorption, in particular physisorption and/or chemisorption, of oxides of sulfur and of nitrogen, hydrogen halides, cyanogen gas, hydrogen cyanide, hydrogen sulfide and/or ammonia and also chlorine gas.

A further advantage of the activated carbon used in the filter material of the present invention is additionally that the sorption properties are at least essentially independent of the atmospheric humidity, in particular with regard to the atmospheric humidities customary under service conditions.

In addition, the activated carbon used in the filter material of the present invention has outstanding sorptive properties at low as well as high concentrations of (noxiant) materials/gases to be sorbed out of media to be cleaned, such as air, meaning that this activated carbon is also useful, for example, for the cleaning of air for cleanroom conditions.

The ionic liquid (IL) used in the context of the present invention comprises salts which melt at low temperatures, i.e., particularly salts which are liquids at room temperature (T=20° C.). More particularly, the ionic liquid (IL) used according to the present invention has nonmolecular, ionic characteristics, i.e., the ionic liquid (IL) is in ionic/dissociated form. The melting point of the ionic liquid (IL) used according to the present invention is generally in the range from 250° C. to −90° C., in particular in the range from 200° C. to −100° C. and preferably in the range from 100° C. to −90° C. (at atmospheric pressure, i.e., 1.013 bar.

The ionic liquid (IL) is generally formed of positive ions (cations) and negative ions (anions) subject to the proviso that the net charge of the ionic liquid (IL) is neutral. In general, not only the anions but also the cations of an ionic liquid (IL) can independently be organic or inorganic in nature, so the ionic liquid (IL) is generally an organic or inorganic salt which melts at low temperatures. The cations and/or anions of an ionic liquid (IL) are preferably monovalent, but valences can also be higher and/or (provided overall charge neutrality is maintained) different, and so the number of anions is not necessarily equal to the number of cations. It is equally possible for ionic liquids (ILs) to represent combinations both of different anions and of different cations.

Appropriate selection of the underlying cations and/or anions is a particular way to intentionally vary the polarity and hence tune/vary the solubility properties of the underlying ionic liquid (IL). Not only water-miscible ionic liquids but also water-immiscible ionic liquids can be used/varied in this way. An in-principle possibility is the use of such ionic liquids (ILs) as form two phases even with organic solvents, although this is not preferred according to the present invention. What is preferred according to the present invention is that the ionic liquid (IL) used be a compound that is miscible with, or soluble in, specifically polar organic liquids/solvents.

In contrast to conventional molecular liquids, ionic liquids (ILs) are completely ionic/ionic in their entirety. Owing to the previously recited properties, ionic liquids (ILs) are thus even at low temperatures, for example at room temperature (T=20° C.), and atmospheric pressure in the form of a melt so to speak and/or in dissociated form on the basis of the underlying cations and anions.

In this context, ionic liquids (ILs) have special physicochemical properties, for example electrical conductivity and specific dissolution and mixing properties. Ionic liquids (ILs) generally have an extremely low vapor pressure and hence a negligible tendency, if any, to evaporate. This is also an immense engineering advantage, since this means that, for example, distillative separation of a reaction mixture can be an effective procedure for product removal because the known prior art problems of azeotrope formation between solvents and products do not arise. More particularly, ionic liquids (ILs) suffer at least essentially no macroscopic losses due to evaporation or the like even under high-vacuum conditions at below their decomposition temperature, which is often above 200° C. Moreover, ionic liquids (ILs) as used according to the present invention are generally not flammable.

The physicochemical properties of ionic liquids (ILs) can be varied/adjusted between wide limits owing to the huge scope for varying the structure of their cations and/or anions, so the ionic liquids (ILs) used in the context of the present invention can be kind of custom-tailored/optimized for the particular planned use in order that a particularly effective enhancement of the activated carbon used according to the present invention with the metallic component may thereby be made possible. For instance, the polarity, the viscosity, the melting behavior, in particular the melting point, or the like can be predetermined/set in a specific manner.

To be more precise, an ionic liquid (IL) is such a liquid as contains nothing but ions. An ionic liquid (IL) is thus so to speak a liquid salt in the form of a melt without the underlying salt being a solute in a solvent, such as water. As mentioned, an ionic liquid (IL) is accordingly such a salt as is in the liquid/molten state at temperatures below 250° C., in particular below 200° C., preferably below 100° C., at atmospheric pressure. It can be said in summary that ionic liquids (ILs) are notable for a whole series of useful properties. As mentioned, ionic liquids (ILs) are thermally stable, nonflammable and have a very low and almost nonmeasurable vapor pressure. Ionic liquids (ILs) further have very good dissolving properties in respect of numerous substances. Owing to their purely ionic constitution, ionic liquids (ILs) have special electrochemical properties, for example electrical conductivity and high electrochemical stability and hence high stability to oxidation and reduction. Especially the ability to vary the cation and the anion, particularly by using specific organic nuclei for the cation/anion, in particular for the cation, and/or side chains and/or substituents, can be used to vary, for example, the solubility in water or organic solvents, and this applies equally to the melting point and the viscosity.

For further information regarding ionic liquids (ILs), reference can be made to the scientific paper published by Wasserscheid P., Keim W., *Angew. Chem.*, 2000, 112, 3926-3945.

In general, the ionic liquid (IL) used according to the present invention is a compound of general formula $[Kat]^{n+}[An]^{n-}$, wherein "Kat" designates a cation and "An" designates an anion and "n" designates an integer equal to 1 or 2, in particular 1. It is accordingly preferable according to the present invention for the ionic liquid (IL) to have monovalent cations and/or anions.

It can also be provided in the context of the present invention that the ionic liquid (IL) is a compound of general formula $[Kat_1]_x{}^{y+}[An_1]_y{}^{x-}$ wherein "$Kat_1$" designates a cation and "$An_1$" designates an anion and wherein "x" and "y" each independently designate an integer from 1 to 4, in particular from 1 to 3, preferably 1 or 2 and more preferably 1.

The cation $[Kat]^{n+}$ of the ionic liquid (IL) can further be a nitrogen-containing cation. In this context, it can be provided according to the present invention that the nitrogen-containing cation is selected from the group of quaternary ammonium cations, imidazolium cations, pyridinium cations, pyrazolium cations and triazinium cations, in particular imidazolium cations. The designation of the heteroaromatics here relates not just to the abovementioned basic structure or core as such, but also comprehends substituted derivatives of these basic structures or cores, for which in particular also the substituents to be recited hereinbelow can also come into consideration.

It can be provided in the context of the present invention that the cation $[Kat]^{n+}$ of the ionic liquid (IL) is a phosphorus-containing cation, in particular a phosphonium cation.

It will be found particularly advantageous for the purposes of the present invention for the cation $[Kat]^{n+}$ of the ionic liquid (IL) to be selected from the group of quaternary ammonium cations of general formula (I):

$$[NR^1R^2R^3R]^+ \qquad \text{formula (I)}$$

phosphonium cations of general formula (II):

$$[PR^1R^2R^3R]^+ \qquad \text{formula (II)}$$

imidazolium cations of general formula (III):

formula (III)

where, in formula (III), the imidazole nucleus is optionally substituted with at least one group selected from $(C_1\text{-}C_8)$-alkyl groups, $(C_1\text{-}C_8)$-alkoxy groups, $(C_1\text{-}C_8)$-aminoalkyl groups, $(C_5\text{-}C_{12})$-aryl groups and $(C_5\text{-}C_{12})$-aryl-$(C_1\text{-}C_8)$-alkyl groups;

pyridinium cations of general formula (IV):

formula (IV)

where, in formula (IV), the pyridine nucleus is optionally substituted with at least one group selected from $(C_1$-$C_6)$-alkyl groups, $(C_1$-$C_6)$-alkoxy groups, $(C_1$-$C_6)$-aminoalkyl groups, $(C_5$-$C_{12})$-aryl groups or $(C_5$-$C_{12})$-aryl-$(C_1$-$C_6)$-alkyl groups;

pyrazolium cations of general formula (V):

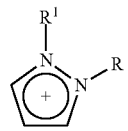

formula (V)

where, in formula (V), the pyrazole nucleus is optionally substituted with at least one group selected from $(C_1$-$C_6)$-alkyl groups, $(C_1$-$C_6)$-alkoxy groups, $(C_1$-$C_6)$-aminoalkyl groups, $(C_5$-$C_{12})$-aryl groups or $(C_5$-$C_{12})$-aryl-$(C_1$-$C_6)$-alkyl groups; and triazinium cations of general formula (VI):

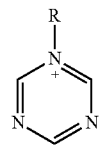

formula (VI)

where, in formula (VI), the triazine nucleus is optionally substituted with at least one group selected from $(C_1$-$C_6)$-alkyl groups, $(C_1$-$C_6)$-alkoxy groups, $(C_1$-$C_6)$-aminoalkyl groups, $(C_5$-$C_{12})$-aryl groups and $(C_5$-$C_{12})$-aryl-$(C_1$-$C_6)$-alkyl groups;

where, in formulae (I) to (VI), independently of each other, the radicals $R^1$, $R^2$ and $R^3$ are each independently selected from the group of hydrogen;

linear or branched, saturated or unsaturated, aliphatic or alicyclic $(C_1$-$C_{20})$-alkyl groups;

heteroaryl groups or $(C_3$-$C_8)$-heteroaryl-$(C_1$-$C_6)$-alkyl groups, in particular with respectively at least one heteroatom, in particular selected from the group of N, O and S, in particular wherein the heteroaryl radical is optionally substituted with at least one group, in particular at least one $(C_1$-$C_6)$-alkyl group, and/or at least one halogen atom; and aryl groups or $(C_5$-$C_{12})$-aryl-$(C_1$-$C_6)$-alkyl groups, in particular wherein the aforementioned groups are each optionally substituted with at least one $(C_1$-$C_6)$-alkyl group, and/or at least one halogen atom; and where, in formulae (I) to (VI), independently of each other, the radical R is selected from linear or branched, saturated or unsaturated, aliphatic or alicyclic $(C_1$-$C_{20})$-alkyl groups;

$(C_3$-$C_8)$-heteroaryl-$(C_1$-$C_6)$-alkyl groups, in particular with respectively at least one heteroatom, in particular selected from the group of N, O and S, in particular wherein the heteroaryl radical is optionally substituted with at least one group, in particular at least one $(C_1$-$C_6)$-alkyl group, and/or at least one halogen atom; and $(C_5$-$C_{12})$-aryl-$(C_1$-$C_6)$-alkyl groups, in particular wherein the aforementioned groups are optionally substituted with at least a $(C_1$-$C_6)$-alkyl group and/or a halogen atom.

In an embodiment which is preferred according to the present invention, the cation $[Kat]^{n+}$ of the ionic liquid (IL) is an imidazolium cation of general formula (III):

formula (III)

where, in formula (III), the imidazole nucleus is optionally substituted with at least one group selected from $(C_1$-$C_8)$-alkyl groups, $(C_1$-$C_8)$-alkoxy groups, $(C_1$-$C_8)$-aminoalkyl groups, $(C_5$-$C_{12})$-aryl groups and $(C_5$-$C_{12})$-aryl-$(C_1$-$C_8)$-alkyl groups and where, in formula (III), the radicals R and $R^1$ are each independently selected from the group of linear or branched, saturated or unsaturated, aliphatic or alicyclic, specifically linear $(C_1$-$C_{20})$-alkyl groups, in particular wherein the radicals R and $R^1$ are different from each other, and/or in particular wherein the radicals R and $R^1$ have mutually different numbers of carbon atoms, and/or where, in formula (III), the radical R is a methyl group and where, in formula (III), the radical $R^1$ is a specifically linear $(C_1$-$C_{20})$-alkyl group, preferably a specifically linear $(C_2$-$C_{12})$-alkyl group, more preferably a specifically linear $(C_2$-$C_8)$-alkyl group, and/or where, in formula (III), the radical R is a methyl group and where, in formula (III), the radical $R^1$ is an ethyl group, butyl group or octyl group, in particular an ethyl group.

Particularly good results are further obtained in the context of the present invention when the cation $[Kat]^{n+}$ of the ionic liquid (IL) is a 1-ethyl-3-methylimidazolium cation ($[EMIM]^+$), 1-butyl-3-methylimidazolium cation ($[BMIM]^+$) or 1-octyl-3-methylimidazolium cation ($[OMIM]^+$), in particular a 1-ethyl-3-methylimidazolium cation ($[EMIM]^+$).

It can be provided according to the present invention that the anion $[An]^{n-}$ of the ionic liquid (IL) used according to the present invention is an organic or inorganic anion.

In this context, the anion $[An]^{n-}$ of the ionic liquid (IL) can be selected from anions of the group of chlorocuprate ($[CuCl_3]^-$), bromocuprate ($[CuBr_3]^-$), chlorostannate ($[SnCl_3]^-$, $[SnCl_5]^-$), bromostannate ($[SnBr_3]^-$), chlorozincate ($[ZnCl_3]^-$), bromozincate ($[ZnBr_3]^-$), chloroferrate ($[FeCl_3]^-$), bromoferrate ($[FeBr_3]^-$), chlorocobaltate ($[CoCl_3]^-$), bromocobaltate ($[CoBr_3]^-$), chloronickelate ($[NiCl_3]^-$), bromonickelate ($[NiBr_3]^-$), tetrafluoroborate ($[BF_4]^-$), tetrachloroborate ($[BCl_4]^-$), hexafluorophosphate ($[PF_6]^-$), hexafluoroantimonate ($[SbF_6]^-$), hexafluoroarsenate ($[AsF_6]^-$), sulfate ($[SO_4]^{2-}$), carbonate ($[CO_3]^{2-}$), fluorosulfonate, $[R'$—$COO]^-$, $[R'$—$SO_3]^-$, $[R'$—$SO_4]^-$, $[R'_2PO_4]^-$, tetrakis(3,5-bis(trifluoromethyl)phenyl)borate ($[BARF]^-$) and bissulfonylamide $[(R'$—$SO_2)_2N]^-$, where R' is a linear or branched, aliphatic or alicyclic alkyl radical containing 1 to 12 carbon atoms or a $(C_5$-$C_{18})$-aryl radical, a $(C_5$-$C_{18})$-aryl-$(C_1$-$C_6)$-alkyl radical or a $(C_1$-$C_6)$-alkyl-$(C_5$-$C_{18})$-aryl radical, wherein the radical is optionally substituted with halogen atoms and/or oxygen atoms.

It can equally be provided according to the present invention for the anion $[An]^{n-}$ of the ionic liquid (IL) to be selected from the group of dicyanamide ($[N(CN)_2]^-$), halides, in particular Cl$^-$, Br$^-$, F$^-$, I$^-$, nitrate ($[NO_3]^-$), nitrite ($[NO_2]^-$), anionic metal complexes, in particular $[CuCl_4]^{2-}$, $[PdCl_4]^{2-}$ or $[AuCl_4]^-$, acetate ($[CH_3COO]^-$), trifluoroacetate ($[F_3CCOO]^-$), tosylate ($[C_7H_7SO_3]^-$), nonafluorobutanesulfonate ($[C_4F_9SO_3^-$) tris (pentafluoroethyl) trifluorophosphate ([PF$_3$(C$_2$F$_5$)$_3$]$^-$), tricyanomethide ([C(CN)$_3$]$^-$), tetracyanoborate ([B(CN)$_4$]$^-$), thiocyanate ([SCN]$^-$), carboxylate ([R"—COO]$^-$), sulfonate ([R"—SO$_3$]$^-$), dialkylphosphate ([R"PO$_4$R'"]$^-$) or bissulfonylimides [(R"—SO$_2$)$_2$N]$^-$), wherein R" and R'" are each independently a linear, branched, aliphatic or alicyclic (C$_5$-C$_{18}$)-alkyl radical or a (C$_5$-C$_{18}$)-aryl radical, (C$_5$-C$_{18}$)-aryl-(C$_1$-C$_6$)-alkyl radical or (C$_1$-C$_6$)-alkyl-(C$_5$-C$_{18}$)-aryl radical, in particular wherein the radical is optionally substituted by halogen atoms or oxygen atoms.

Particularly good results regarding the sorptive properties of the activated carbon used in the filter material of the present invention are further obtained when the anion [An]$^{n-}$ of the ionic liquid (IL) is a halide anion, in particular Cl$^-$, Br$^-$, F$^-$, I$^-$, preferably Cl$^-$, and/or when the anion [An]$^{n-}$ of the ionic liquid (IL) is a carboxylic acid anion, in particular an acetate anion.

It is preferable according to the present invention for the ionic liquid (IL) to be selected from the group of compounds of formulae (VII) to (IX)

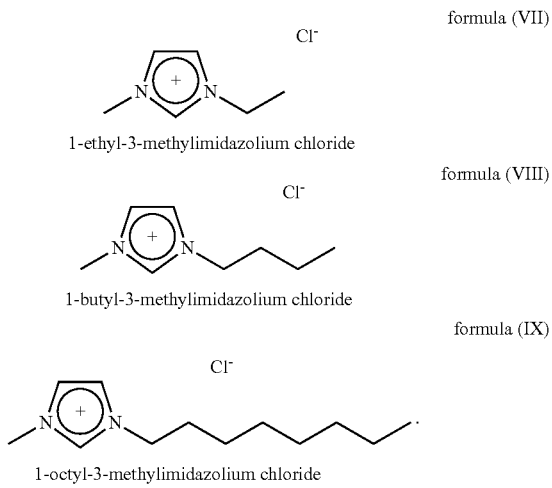

formula (VII)

1-ethyl-3-methylimidazolium chloride formula (VIII)

1-butyl-3-methylimidazolium chloride formula (IX)

1-octyl-3-methylimidazolium chloride

It will be found particularly advantageous in this connection for the ionic liquid (IL) to be a compound of formula (VII).

Applicants in this connection found utterly surprisingly that particularly the use of an ionic liquid (IL) having a cation in the form of a 1-ethyl-3-methylimidazolium cation ([EMIM]$^+$), a 1-butyl-3-methylimidazolium cation ([BMIM]$^+$) and/or a 1-octyl-3-methylimidazolium cation ([OMIM]$^+$), particularly the use of a corresponding chloride anion, gives outstanding results for the enhancement of the activated carbon used in the filter material of the present invention with catalytic/reactive properties, specifically in the order [EMIM]$^+$, [BMIM]$^+$ and [OMIM]$^+$, of which [EMIM]$^+$ delivers the best results, i.e., results obtained with regard to the enhancement with the metallic component improve as the chain length of the substitute decreases. Without wishing to be tied to this theory, it is believed that the abovementioned cations, particularly when used together with a corresponding chloride anion, possess particularly good compatibility with the activated carbon to be enhanced, ensuring particularly effective impregnation of the pore system of the activated carbon. The size, charge density and spatial structure of the cations in question play a part here in particular. Still further improved results are obtained, as mentioned, by using [EMIM]$^+$, the pore accessibility of which could be said to be further optimized. Moreover, a smaller size on the part of the cation makes it possible to achieve larger fractions, in particular larger molar mass fractions, for the metal/metal compound in the metallic component or the metal-containing ionic liquid (IL), benefiting the catalytic/reactive properties.

In general, it is also possible in the context of the present invention for the metallic component to contain a mixture of mutually different ionic liquids (ILs).

It is further preferable according to the present invention for the metallic component to include at least one metal, in particular in the form of a metal compound, dissolved and/or dissociated in at least one ionic liquid (IL), in particular in the ionic liquid (IL). In other words, it is preferable according to the present invention for the ionic liquid (IL) to be so to speak the vehicle/solvent for the metal compound of the metallic component. And, as mentioned, it is preferable for the metal compound to be in an at least essentially completely dissolved/dissociated state in the ionic liquid (IL), so the metallic component overall constitutes in particular a crystal-, crystallite- and/or at least essentially particle-free liquid, in particular solution/melt.

It can be provided according to the present invention that the metallic component and/or the ionic liquid (IL) includes at least one metal in a positive oxidation state, in particular at least one metal cation. In this connection, the oxidation state of the metal can lie in the range from +I to +VII, in particular in the range from +I to +IV and preferably in the range from +I to +III. It is particularly preferable for the oxidation state of the metal to be +I or +II. In the case of simple ions, the oxidation number corresponds to the number of charges, while in the case of multinuclear ions, in particular clusters, the oxidation number can differ from the number of charges, as is well known to those skilled in the art.

According to the present invention, the metallic component and/or the ionic liquid (IL) can include at least one metal selected from the group of metals of the main and transition groups of the periodic table and the lanthanides. It is equally possible for the metallic component and/or the ionic liquid (IL) to include at least one metal from the main or transition groups of the periodic table or at least one lanthanide. More particularly, the metallic component and/or the ionic liquid (IL) can include at least one metal selected from elements of main group IV or of transition groups I, II, III, IV, V, VI, VII and VIII of the periodic table, in particular from elements of main group IV or of transition groups I and II of the periodic table.

It is preferable according to the present invention for the metallic component and/or the ionic liquid (IL) to include at least one metal selected from the group of Cu, Ag, Au, Zn, Hg, Ln, Ce, Ti, Zr, V, Nb, Cr, Mo, W, Mn, Fe, Ru, Os, Co, Rh, Ir, Ni, Pd and Pt, in particular Zn, Ag, Sn, Ni and Cu.

In general, the metallic component and/or the ionic liquid (IL) should include at least one metal compound which is soluble or dissociable in the ionic liquid (IL) and is preferably based on at least one metal as defined above. The metallic component and/or the ionic liquid should equally include at least one inorganic or organic metal compound, preferably based on at least one metal as defined above, in particular a metal salt or metal oxide, preferably a metal salt.

The term "soluble" or "dissociable" as used in this connection in the context of the present invention is to be understood as meaning in particular that, at the chosen concentrations/amounts, the metal compound is present in the ionic liquid (IL)/metallic component in an at least essentially completely dissolved/dissociated state, so at least essentially no solid particles/crystals and/or crystallites are present in the metallic component in this regard.

It can be more particularly provided in the context of the present invention that the metallic component and/or the ionic liquid (IL) includes an organic or inorganic metal salt, preferably based on at least one metal as defined above. The metal salt in question may be selected from the group of halide salts, sulfates, sulfides, sulfites, nitrates, nitrites, phosphates, phosphides, phosphites, carbamates, alkoxides and carboxylic acid salts, in particular halide salts and carboxylic acid salts.

More particularly, the metallic component and/or the ionic liquid (IL) may include a metal halide, preferably based on at least one metal as defined above, in particular a fluoride, chloride, bromide or iodide, preferably chloride, or a carboxylic acid salt of a metal, in particular acetate.

In an embodiment which is particularly preferred according to the present invention, the metallic component and/or the ionic liquid (IL) can include a metal compound selected from the group of nickel chloride, copper chloride, zinc acetate and tin acetate. For instance, the use of copper compounds/salts, in particular in the form of copper chloride, for example for the sorption of nitrogen-containing gases, in particular ammonia ($NH_3$), will be found advantageous in that, without wishing to be tied to this theory, ammonia is believed to be sorbed in particular in the form of irreversible gas binding. This chemisorption results in particular in the formation of a copper tetramine complex ($[Cu(NH_3)_4]^{2+}$), although part of the sorbed ammonia also becomes bound via physisorption. Again the result is only minimal desorption of the sorbed compounds.

More particularly, the ionic liquid (IL) is together with the metal and/or the metal compound in the form of a melt. Equally, as mentioned, the metal and/or the metal compound should be present in the ionic liquid (IL) in an at least essentially crystal- and/or crystallite-free form. Equally, the metal and/or the metal compound should be present in the ionic liquid (IL) in an at least essentially dissolved, in particular at least essentially dissociated, form.

The amount of metal in the ionic liquid (IL) can vary between wide limits. However, in a preferred embodiment of the present invention the ionic liquid (IL) contains the metal, in particular the metal compound, in amounts of 0.001 wt % to 80 wt %, in particular 0.01 wt % to 60 wt %, preferably 0.1 wt % to 50 wt %, based on the ionic liquid (IL) and reckoned as metal.

Particularly good results are also obtained when the metallic component/the metal-containing ionic liquid (IL) contains the metal, in particular in the form of the metal compound, in a molar mass fraction ranging from 1% to 90%, in particular ranging from 5% to 70%, preferably ranging from 10% to 60% and more preferably ranging from 10% to 55%, based on the metallic component/the metal-containing ionic liquid (IL) and reckoned as metal.

The ratio between the ionic liquid (IL) on the one hand and the metal used on the other also has significance for the catalytic/reactive properties. Particularly good results are obtained according to the present invention when the molar ratio of ionic liquid (IL) to metal "[ionic liquid (IL):metal]" lies in the range from [10:0.1] to [0.1:10], in particular in the range from [1:0.5] to [1:3], preferably in the range from [1:0.6] to [1:2] and more preferably in the range from [1:1] to [1:1.6].

As far as the above-recited values regarding the amount and molar mass fraction of the metal/metal compound and the molar ratio of ionic liquid (IL) to metal are concerned, the upper limits thereof must also be appropriately selected/ adjusted with regard to the solubility behavior of the metal/ metal compound, in particular such that at least essentially no solid bodies/crystals/crystallites of the metal/metal compound shall be present in the resulting solution/melt. This is within the routine expertise of those skilled in the art.

To further optimize the wetting/impregnation of the activated carbon with the metallic component, it can be provided according to the present invention that the mixture, in particular the solution and/or melt, of the ionic liquid (IL) and the metal, in particular the metal compound, has a specific density of 1 $g/cm^3$ to 2.5 $g/cm^3$, in particular 1.2 $g/cm^3$ to 2 $g/cm^3$, preferably 1.3 $g/cm^3$ to 1.9 $g/cm^3$, at a temperature T=20° C. and atmospheric pressure. The specific density can be determined in particular with a helium pyknometer at a temperature of T=20° C. and atmospheric pressure.

It is provided in particular in the context of the present invention that the activated carbon is at least partially contacted and/or wetted and/or covered, in particular impregnated, with the metal-containing ionic liquid (IL). Equally, it can be provided according to the present invention that the surface of the activated carbon and/or the pore system of the activated carbon, in particular the micropores, mesopores and/or macropores, preferably the surface of the activated carbon and the pore system of the activated carbon, are contacted and/or wetted and/or covered, in particular impregnated, with the metal-containing ionic liquid (IL) to an at least partial extent and/or in a defined degree of coverage/filling.

The enhancement of the activated carbon with the metallic component in respect of both the external and the internal structures is what in effect makes possible a particularly high level of catalytic activity/reactivity on the part of the activated carbon used in the filter material of the present invention.

In this connection, it is advantageous in the context of the present invention when the activated carbon includes the metal-containing ionic liquid (IL) in amounts of 1 vol % to 70 vol %, in particular 2 vol % to 60 vol %, preferably 3 vol % to 50 vol %, more preferably 5 vol % to 40 vol %, based on the volume of the activated carbon. Equally, it can be provided according to the present invention that the activated carbon includes the metal-containing ionic liquid (IL) in amounts of not less than 1 vol %, in particular not less than 2 vol %, preferably not less than 3 vol %, more preferably not less than 5 vol %, based on the volume of the activated carbon. In addition to the lower limit recited above, the upper limit is also very important as regards the amounts of ionic liquid (IL) which are to be used. It can be provided according to the present invention that the activated carbon includes the metal-containing ionic liquid (IL) in amounts of not more than 70 vol %, in particular not more than 60 vol %, preferably not more than 50 vol %, more preferably not more than 40 vol %, based on the volume of the activated carbon.

As regards the sorptive properties, in particular the combined physisorptive and chemisorptive properties, the pore-filling degree α of the activated carbon with the metal-containing ionic liquid (IL) is also very important. It is preferred according to the present invention for the activated carbon in relation to the metal-containing ionic liquid (IL) to have a pore-filling degree α of 0.01 to 0.99, in particular of 0.05 to 0.8, preferably of 0.1 to 0.6, more preferably of 0.15 to 0.5. In this connection, the activated carbon in relation to the metal-containing ionic liquid (IL) should have a pore-filling degree α of not more than 0.99, in particular not more than 0.8, preferably not more than 0.6, more preferably not more than 0.5. Equally, the activated carbon used according to the present invention in relation to the metal-containing ionic liquid (IL) should have a pore-filling degree α of not less than 0.01, in particular not less than 0.05, preferably not less than 0.1, more preferably not less than 0.15.

The pore-filling degree α is computed according to the formula [α=$V_{IL}/(V_{pore} \cdot m_{carrier})$]. In the aforementioned formula, "$V_{IL}$" designates the volume of the ionic liquid (IL) to be used, "$m_{carrier}$" designates the mass of the activated carbon to be used and "$V_{pore}$" designates the specific (mass-based) pore volume of the activated carbon. In other words, the pore-filling degree α represents a measure for the degree of contacting/wetting/covering, in particular impregnating, of the activated carbon with the metallic component based on the ionic liquid (IL) which is metal-containing and/or contains metal ions, in that the recited values must be understood as relative to the overall pore volume. A pore-filling degree α of 0.2 thus means that 20% of the pore volume is filled with the metallic component and may indicate in particular—without wishing to be tied to this theory—that the walls of the particular pores are wetted with a corresponding layer of the metallic component comprising the ionic liquid (IL) and the metal or the metal ions. In general, the layer thickness of the metallic component here is in the region of a few nm. Setting the pore-filling degree α to a specific value ensures that a certain proportion of the pore system remains free—not covered with the metallic component, that is—and thus has physisorptive properties in particular.

More particularly, in the context of the present invention, the pore-filling degree α and/or the amount of metal-containing ionic liquid (IL) should be determined such that 20% to 95%, in particular 30% to 90%, preferably 40% to 80%, of the (inner) pore volume of the activated carbon is not filled with the metal-containing ionic liquid (IL). In other words, after the activated carbon has been enhanced with the metal-containing ionic liquid (IL), 20% to 95%, in particular 30% to 90%, preferably 40% to 80%, of the (inner) pore volume of the activated carbon should be freely accessible to sorptive, in particular physisorptive, processes. This ensures that the enhancement with the metal-containing ionic liquid (IL) still leaves adequate sorptive capacity by the activated carbon as such, in particular on the basis of physisorption.

On the basis of the concept according to the present invention of specifically enhancing a carrier system with a reactive/catalytically active component in the form of a liquid, the activated carbon used in the filter material of the present invention can also be configured as and termed an SILP (Supported Ionic Liquid Phase) system.

The activated carbon to be used in the context of the present invention for enhancement with the metallic component can be any of a multiplicity of different activated carbons, for example of differing pore structure as regards the distribution of micro-, meso- and macropores. Commercially available activated carbons can be used in particular. Activated carbons used for enhancement/impregnation in the context of the present invention are marketed, for example, by Blücher GmbH, Erkrath, Germany or AdsorTech GmbH, Premnitz, Germany.

The activated carbon used for enhancement in the manner of the invention can further be in particular a granular, specifically spherical, activated carbon.

The activated carbon used for the impregnation according to the present invention, in particular granulocarbon or spherocarbon, is obtainable by known methods of the prior art: Typically granular/spherical sulfonated organic polymers, in particular those based on divinylbenzene-cross-linked polystyrene, are carbonized and subsequently activated to form the activated carbon in question. For further details in this regard, reference may be made, for example, to the printed publications DE 43 28 219 A1, DE 43 04 026 A1, DE 196 00 237 A1 and EP 1 918 022 A1 and/or to the parallel printed publication U.S. Pat. No. 7,737,038 B2, which is a member of the same patent family. It is equally possible to use activated carbon based on other starting materials, such as pitch or the like. This is known per se to those skilled in the art.

The parametric data recited hereinbelow with regard to the activated carbon used are determined by means of standardized or explicitly reported methods of determination or using methods of determination which are per se familiar to those skilled in the art. Especially the parametric data relating to the characterization of the porosity, of the pore size distribution and other adsorptive properties are generally each obtained from the particular nitrogen sorption isotherms of the particular activated carbon and/or the products measured.

The present invention uses in particular an activated carbon having particle sizes, in particular corpuscle diameters, in the range from 0.001 to 2 mm, in particular 0.01 to 1 mm, preferably 0.05 to 0.8 mm, more preferably 0.1 to 0.7 mm, still more preferably 0.15 to 0.6 mm. In this case, based on the activated carbon, not less than 80 wt %, in particular not less than 90 wt %, preferably not less than 95 wt %, of the activated carbon used should have particle sizes, in particular corpuscle diameters, in the aforementioned ranges.

It is further advantageous according to the present invention for the activated carbon to have median particle sizes (D50), in particular median corpuscle diameters (D50), in the range from 0.01 to 1 mm, in particular 0.05 to 0.8 mm, preferably 0.1 to 0.6 mm, more preferably 0.15 to 0.5 mm, still more preferably 0.2 to 0.4 mm.

The corpuscle sizes/diameters in question can be determined on the basis of the ASTM D2862-97/04 procedure for example. In addition, the aforementioned sizes can be determined with methods of determination which are based on a sieve analysis, x-ray diffraction, laser diffractometry or the like. The particular methods of determination are as such well known to those skilled in the art, so no further elaboration is needed in this regard.

More particularly, the activated carbon used in the filter material of the present invention should have a total pore volume, in particular a Gurvich total pore volume, in the range from 0.4 to 4 $cm^3/g$, in particular 0.5 to 3.5 $cm^3/g$, preferably 0.6 to 3 $cm^3/g$, more preferably 0.7 to 2.5 $cm^3/g$. In this context, it is advantageous according to the present invention for 50% to 99%, in particular 60% to 99%, preferably 70% to 95%, of the total pore volume, in particular of the Gurvich total pore volume, of the activated carbon to be formed by pores having pore diameters of ≤50 nm, in particular by micro- and/or mesopores, and/or for 20% to 85%, in particular 30% to 80%, preferably 40% to 75%, of the total pore volume, in particular of the Gurvich total pore volume, of the activated carbon to be formed by pores having pore diameters in the range from 2 nm to 50 nm, in particular by mesopores.

According to the present invention, the use of activated carbon having high micro- and mesoporosity, in particular having high mesoporosity, gives particularly good results with regard to the sorption of gases to be sorbed, such as in particular hydrogen sulfide and ammonia.

The Gurvich determination of total pore volume is a method of measurement/determination which is known per se to a person skilled in the art. For further details regarding the Gurvich determination of total pore volume, reference can be made for example to L. Gurvich (1915), J. Phys. Chem. Soc. Russ. 47, 805, and also to S. Lowell et al., Characterization of Porous Solids and Powders: Surface Area Pore Size and Density, Kluwer Academic Publishers, Article Technology Series, pages 111 ff.

More particularly, it can be provided in the context of the present invention that the activated carbon has a pore volume formed by pores having pore diameters≤2 nm, in particular a carbon black micropore volume, in the range from 0.1 to 2 cm$^3$/g, in particular 0.2 to 1.5 cm$^3$/g, preferably 0.3 to 1.1 cm$^3$/g, more preferably 0.4 to 1 cm$^3$/g, and/or in that 20% to 95%, in particular 30% to 95%, preferably 40% to 90%, of the total pore volume of the activated carbon is formed by pores having pore diameters of ≤2 nm, in particular by micropores.

The carbon black method of determination is known per se to one skilled in the art, so no further details need be provided in this regard. In addition, for further details of the carbon black method of determining the pore surface area and the pore volume, reference may be made for example to R. W. Magee, Evaluation of the External Surface Area of Carbon Black by Nitrogen Adsorption, Presented at the Meeting of the Rubber Division of the American Chem. Soc., October 1994, as cited in, for example: Quantachrome Instruments, AUTOSORB-1, AS1 WinVersion 1.50, Operating Manual, OM, 05061, Quantachrome Instruments 2004, Florida, USA, pages 71 ff.

It is equally advantageous in the context of the present invention for the activated carbon to have a median pore diameter in the range from 1 to 60 nm, in particular 1 to 55 nm, preferably 1.5 to 50 nm, more preferably 2 to 45 nm. The mean pore diameter is determined on the basis of the particular nitrogen sorption isotherms.

To maintain the sorption properties of the activated carbon used according to the present invention, the activated carbon used should have a sufficiently large BET surface area. More particularly, the activated carbon should have a specific BET surface area in the range from 500 m$^2$/g to 3500 m$^2$/g, in particular 600 to 3000 m$^2$/g, preferably 700 to 2750 m$^2$/g, more preferably 800 to 2500 m$^2$/g.

Determining the specific surface area as per BET is in principle known per se to a person skilled in the art, so no further details need be provided in this regard. All BET surface area statements relate to the determination as per ASTM D6556-04. In the context of the present invention, the MultiPoint BET method of determination (MP-BET) in a partial pressure range $p/p_0$ of 0.05 to 0.1 is used to determine the BET surface area, in general and unless hereinbelow expressly stated otherwise.

In respect of further details regarding the determination of the BET surface area and of the BET method, reference can be made to the aforementioned ASTM D6556-04 standard and also to Römpp Chemielexikon, 10$^{th}$ edition, Georg Thieme Verlag, Stuttgart/New York, headword: "BET-Methode", including the references cited there, and to Winnacker-Küchler (3$^{rd}$ edition), volume 7, pages 93 ff. and also to Z. Anal. Chem. 238, pages 187 to 193 (1968).

It is further advantageous for the activated carbon to have a micropore surface area of 400 to 2500 m$^2$/g, in particular 500 to 2300 m$^2$/g, preferably 600 to 2100 m$^2$/g, more preferably 700 to 1900 m$^2$/g.

The activated carbon used according to the present invention should also have a specific density of 1.1 to 3.5 g/ml, in particular of 1.5 to 3 g/ml, preferably of 1.75 to 2.75 g/ml, more preferably of 2 to 2.5 g/ml.

Equally, the activated carbon should have a settled density of 0.1 to 1.5 g/ml, in particular of 0.15 to 1 g/ml, preferably of 0.2 to 0.8 g/ml, more preferably of 0.3 to 0.6 g/ml.

It is also advantageous for the activated carbon to have sufficient mechanical stability. More particularly, the activated carbon has a compressive and/or bursting strength (weight-bearing capacity) per activated carbon grain, in particular per activated carbon spherule, of not less than 10 newtons, in particular not less than 15 newtons, preferably not less than 20 newtons. It is further advantageous for the activated carbon to have a compressive and/or bursting strength (weight-bearing capacity) per activated carbon grain, in particular per activated carbon spherule, in the range from 10 to 50 newtons, in particular 12 to 45 newtons, preferably 15 to 40 newtons.

It can equally also be provided in the context of the present invention for the activated carbon to be surface modified. In this context, the surface of the activated carbon can be modified with hydrophilic groups. This can improve the impregnation with the metallic component in a helpful manner.

The filter material of the present invention can in principle be varied in its construction:

As far as the filter material of the present invention is concerned, the activated carbon therein can be self-supporting and/or in the form of a specifically loose bed.

Alternatively, however, it is also possible for the activated carbon to be applied to a carrier material. In this context, the carrier material can be gas permeable, in particular air permeable; as far as the carrier material as such is concerned in this context, it should have a gas permeability, in particular air permeability, of not less than 10 l·m$^{-2}$·s$^{-1}$, in particular not less than 30 l·m$^{-2}$·s$^{-1}$, preferably not less than 50 l·m$^{-2}$·s$^{-1}$, more preferably not less than 100 l·m$^{-2}$·s$^{-1}$, still more preferably not less than 500 l·m$^{-2}$·s$^{-1}$, and/or a gas permeability, in particular air permeability, of up to 10 000 l·m$^{-2}$·s$^{-1}$, in particular up to 20 000 l·m$^{-2}$·s$^{-1}$, at a flow resistance of 127 Pa.

In one embodiment of the present invention, the carrier material used according to the present invention can have a three-dimensional structure. More particularly, in this embodiment, the carrier material used according to the present invention can be configured as a preferably open-pore foam, more preferably polyurethane foam.

In an alternative embodiment, however, the carrier material used according to the present invention can have a two-dimensional and/or sheetlike structure. More particularly, in this embodiment, the carrier material used according to the present invention can be configured as a preferably textile fabric. For example, the carrier material can be configured as a textile fabric, preferably an air-permeable textile material, more preferably a woven, loop-formingly knitted, loop-drawingly knitted, laid or bonded fabric, in particular nonwoven.

Equally, the carrier material can have a basis weight of 5 to 1000 g/m$^2$, in particular 10 to 500 g/m$^2$, preferably 25 to 450 g/m$^2$. In addition, in this embodiment, the carrier material can be a textile fabric containing or consisting of natural fibers and/or synthetic fibers (manufactured fibers). In this context, the natural fibers can be selected from the group of wool fibers and cotton fibers (CO). In addition, the synthetic fibers can be selected from the group of polyesters (PES); polyolefins, in particular polyethylene (PE) and/or polypropylene (PP); polyvinyl chlorides (CLF); polyvinylidene chlorides (CLF); acetates (CA); triacetates (CTA);

acrylics (PAN); polyamides (PA), in particular aromatic, preferably flame-retardant polyamides; polyvinyl alcohols (PVAL); polyurethanes; polyvinyl esters; (meth)acrylates; polylactic acids (PLA); activated carbon; and also mixtures thereof.

Typically, the activated carbon can be fixed to and/or on the carrier material. This can be achieved for example via adherence (via an adhesive, for example) or due to self-tackiness or self-adhesion on the part of the carrier material in particular.

The filter material according to the present invention can further be configured in particular as a filter material for filters for removal of noxiants, odorants and poisonous materials of any kind, in particular from air and/or gas streams, in particular as a filter material for NBC respirators, odor filters, area filters, air filters, in particular filters for room air cleaning, adsorption-capable carrier structures and filters for the medical sector.

More particularly, the filter material of the present invention can be accommodated in a filter unit and/or filtration apparatus and/or can be a constituent part and/or component of a filter unit and/or filtration apparatus.

The filter material of the present invention has a multiplicity of advantages as already itemized above. Owing to the excellent properties, in particular sorptive properties, of the filter material according to the present invention, a broad spectrum of use and/or service scenarios is possible, as will be detailed hereinbelow.

The present invention further provides—in accordance with a second aspect of the present invention—a method of producing in the manner of the present invention a hereinabove-defined/described filter material of the present invention, in particular for use in or as a filter for gas treatment and/or gas cleaning, in particular for cleanroom conditions, by using an activated carbon enhanced and/or endowed with at least one metallic component, in particular by using an activated carbon having reactive and/or catalytic activity, wherein in the context of this method activated carbon, in particular a multiplicity of discrete activated carbon particles, preferably in spherical and/or granular form, is contacted, in particular wetted and/or coated and/or impregnated, with an optionally dilute metal-containing ionic liquid (IL) containing in particular metal ions, preferably based on a metal compound, in particular wherein any solvent used for dilution and/or any metal-containing ionic liquid (IL) not imbibed by the activated carbon and/or in excess is subsequently removed and/or separated off. The activated carbon obtained in this way, enhanced and/or endowed with at least one metallic component, is then thereafter further processed (e.g., as a loose bed or by fixing to a carrier material, etc.)—in a manner known per se—to form the filter material of the present invention.

The present invention equally provides in accordance with this aspect of the present invention a method of producing in the manner of the present invention an above-defined/described filter material of the present invention, in particular for use in or as a filter for gas treatment and/or gas cleaning, in particular for cleanroom conditions, by using an activated carbon enhanced and/or endowed with at least one metallic component, in particular by using an activated carbon having reactive and/or catalytic activity, wherein this method comprises the following steps in the hereinbelow specified order (a) to (c):

(a) producing and/or providing at least one metallic component based on a metal-containing ionic liquid (IL) containing in particular metal ions, preferably on the basis of a metal compound, in particular in the form of a solution and/or melt, wherein at least one metal, in particular in the form of metal ions, preferably based on a metal compound, is contacted, with an ionic liquid (IL), in particular dissolved in an ionic liquid (IL);

(b) contacting, in particular wetting and/or coating and/or impregnating, the activated carbon, in particular a multiplicity of discrete activated carbon particles, preferably in spherical and/or granular form, with the metallic component obtained in step (a) on the basis of the metal-containing ionic liquid (IL); and (c) optionally removing and/or separating off metal-containing ionic liquid (IL) not imbibed by the activated carbon and/or in excess, that is to say therefore metallic component not imbibed by the activated carbon and/or in excess.

The activated carbon obtained in this way, enhanced and/or endowed with at least one metallic component, is then thereafter further processed (e.g., as a loose bed or by fixing to a carrier material, etc.)—in a manner known per se—to form the filter material of the present invention. This means, in other words, that method step (b) or, if used, method step (c) is followed by the activated carbon, enhanced and/or endowed with at least one metallic component, being further processed into the filter material of the present invention.

The method of the present invention is a basis for achieving effective wetting/coating and/or impregnation of the activated carbon. Contacting the activated carbon with the metallic component comprising the ionic liquid (IL) ensures that the metallic component comprising the ionic liquid (IL) does not as it were just wet the surficial structures of the activated carbon, but will also penetrate into the inner pore system of the activated carbon and lead therein to a defined coating/wetting/impregnation of the surfaces of the porous structures, in particular of micro-, meso- and/or macropores. Owing to the special physicochemical properties of the ionic liquid (IL), especially in respect of the extremely low vapor pressure, the ionic liquid (IL) plus the metal/metal ions remains durably, i.e., in particular for the use life of the activated carbon used according to the present invention, in liquid form on and in the activated carbon system, so it is as though a durable catalytically active/reactive film of liquid is formed on the outer and inner surfaces of the activated carbon—without adversely impacting on the physisorptive properties of the activated carbon.

It can further be provided in the context of the method according to the present invention that step (a) is carried out such that the ionic liquid (IL) contains the metal, in particular the metal compound, in amounts of 0.001 wt % to 80 wt %, in particular 0.01 wt % to 60 wt %, preferably 0.1 wt % to 50 wt %, based on the ionic liquid (IL) and reckoned as metal. In this context, it is advantageous according to the present invention for the molar ratio of ionic liquid (IL) to metal "[ionic liquid (IL):metal]" to be set in the range from [10:0.1] to [0.1:10], in particular in the range from [1:0.5] to [1:3], preferably in the range from [1:0.6] to [1:2] and more preferably in the range from [1:1] to [1:1.6], in step (a).

Method step (a) can further be carried out in an inert gas atmosphere and/or with application of shearing forces, in particular by stirring or the like. More particularly, method step (a) can be carried out at room temperature (T=20° C.)

In one embodiment of the present invention, it can further be provided that the metal-containing ionic liquid (IL), containing in particular metal ions, is optionally diluted with a diluent and/or solvent in step (a) and/or between steps (a) and (b) and/or between steps (b) and (c), preferably between steps (a) and (b), optionally with the diluent and/or solvent being subsequently removed and/or separated off particularly in step (c).

The optionally provided dilution can be used to adjust the viscosity of the ionic liquid (IL) in a specific manner in order thereby to facilitate/improve the ingress of the ionic liquid (IL) plus the metal/metal ions and hence of the metallic component into the pore structure of the activated carbon. It is equally possible to use the specific choice of diluent/solvent to adjust the polarity of the ionic liquid (IL), or of the resulting mixture with the solvent, to thereby control/improve the wetting of the surface of the activated carbon.

In this context, a polar and/or hydrophilic inorganic or organic, preferably organic, diluent and/or solvent can be used. It is equally possible to use a diluent and/or solvent having a boiling point (at atmospheric pressure) of not more than 250° C., in particular not more than 200° C., preferably not more than 150° C., more preferably not more than 100° C. It can further be provided according to the present invention for the diluent and/or solvent used to be a monohydric alcohol, in particular methanol, ethanol, butanol and/or propanol, preferably ethanol. Alternatively, however, it is also possible in the context of the procedure according to the present invention for the diluent and/or solvent to be selected from the group of water, hydrochlorocarbons, in particular dichloromethane, aldehydes, ketones, in particular acetone, and mixtures thereof. It is equally possible according to the present invention for mixtures of those solvents to be used. Selecting the diluent/solvent in this regard and setting the mixing ratios are within the routine expertise of those skilled in the art, so this does not need to be further elaborated.

In the context of the procedure according to the present invention, moreover, the diluent and/or solvent can be used in amounts of 0.1 part by volume to 20 parts by volume, in particular 0.2 part by volume to 15 parts by volume, preferably 0.3 part by volume to 10 parts by volume, more preferably 0.5 part by volume to 10 parts by volume, based on 1 part by volume of ionic liquid (IL).

Step (b) of the method according to the present invention can further comprise producing a suspension of the activated carbon in the metal-containing ionic liquid (IL), containing in particular metal ions. Step (b) can equally comprise contacting, in particular wetting and/or coating and/or impregnating, the activated carbon in a suspension of the activated carbon in the ionic liquid (IL).

According to the present invention, moreover, step (b) can further comprise wetting and/or coating and/or impregnating not only the outer but also the inner surfaces, in particular the micro-, meso- and/or macropores, of the activated carbon.

It can equally be provided in the context of the procedure according to the present invention that step (b) comprises selecting and/or setting the volume of the ionic liquid to be used ($V_{IL}$) and/or the mass of the activated carbon to be used ($m_{carrier}$) and/or the specific (mass-based) pore volume of the activated carbon ($V_{pore}$) according to the pore-filling degree α to be set, in particular as per the formula [$α = V_{IL} / (V_{pore} \cdot m_{carrier})$]. It is advantageous according to the present invention in this context to obtain a pore-filling degree α in the range from 0.01 to 0.99, in particular from 0.05 to 0.8, preferably from 0.1 to 0.6, more preferably from 0.15 to 0.5.

With further reference to step (b) of the method according to the present invention, it is advantageous according to the present invention for step (b) to be carried out by energy input. It is particularly advantageous in this regard for the energy input to take the form of ultrasound input or the like. Energy input, in particular in the form of ultrasound, leads particularly to an improved ingress of the metallic component comprising the ionic liquid into the inner pore system of the activated carbon while the degree of wetting and/or the pore-filling volume α can equally be varied/controlled via the intensity and/or duration of the energy input. It is further advantageous according to the present invention for the energy input, in particular the ultrasound input, to be pulsed, for example with an interval of t=0.5 s.

Step (c) of the method according to the present invention can further be carried out by heating, in particular to temperatures in the range from 25° C. to 90° C., in particular in the range from 30° C. to 75° C., preferably in the range from 35° C. to 65° C. Step (c) can equally be carried out under reduced pressure, in particular in a vacuum.

Step (c) can for example carried out at a pressure P in the range from 50 to 300 mbar, in particular 100 to 200 mbar. This can take place for example in a rotary evaporator or the like. Step (c) of the method according to the present invention may further comprise a final drying, in particular in a high vacuum, in particular for a period of 5 to 20 h, preferably at temperatures in the range of T=40° C. to 150° C., in particular 45° C. to 100° C. This can take the form for example of high-vacuum conditions in an oil bath.

The method described above is thus a basis for obtaining a filter material which is in accordance with the present invention and has the above-described advantages and properties.

The present invention thus also provides a filter material which is in accordance with the present invention and which is obtainable using the methods described above.

As mentioned, the filter material of the present invention has a broad spectrum of uses.

The present invention further thus provides in accordance with a third aspect of the present invention—the methods of using the filter material of the present invention in the manner of the present invention.

The filter material of the present invention is useful in the manufacture of protective materials of any kind, in particular in the manufacture of protective apparel, in particular for the civilian or military sector, such as protective suits, protective gloves, protective footwear, protective socks, protective headgear and the like, and of protective coverings of any kind, preferably any aforementioned protective materials for NBC deployment.

The filter material of the present invention is further useful in the manufacture of filters and filter materials of any kind, in particular for removal of noxiant, odorant and poisonous materials of any kind, in particular from air and/or gas streams, such as NBC respirator filters, odor filters, sheet filters, air filters, in particular filters for room air cleaning, adsorption-capable carrier structures and filters for the medical sector. The filter material of the present invention has excellent sorptive properties here, in particular with regard to sulfur-containing and nitrogen-containing gases, such as sulfur hydrides, in particular hydrogen sulfide ($H_2S$), and also with regard to ammonia ($NH_3$). The filter material of the present invention equally has outstanding sorptive properties particularly with regard to halogen gases/vapors, such as chlorine gas and/or iodine vapors. The filter material of the present invention also has outstanding sorptive properties with regard to hydrogen halides, such as hydrogen chloride (HCl).

A further possible application for the filter material of the present invention resides in its use for sorptive, in particular adsorptive, applications, in particular as a preferably reactive and/or catalytic adsorptive filter material.

The filter material of the present invention is further also particularly useful for gas cleaning and/or gas conditioning.

A further use for the filter material of the present invention resides in the context of removing noxiants, in particular gaseous noxiants, or toxic, hazardous or environmentally harmful substances or gases.

The filter material of the present invention is finally also useful for conditioning and/or providing cleanroom atmospheres, in particular for the electrical/electronics industry, in particular for semiconductor or chip manufacture. The outstanding properties of the filter material according to the present invention are also of decisive importance in this regard.

The present invention further provides—in accordance with a fourth aspect of the present invention—a method of cleaning and/or conditioning gases in the manner of the present invention, in particular for removing undesirable, in particular toxic, hazardous or environmentally harmful substances or gases from gas streams, wherein the gas stream to be cleaned and/or conditioned is contacted with a filter material which is in accordance with the present invention as described above.

In this context, the method of the present invention is used in particular for conditioning and or providing cleanroom atmospheres, in particular for the electrical/electronics industry, in particular for semiconductor or chip manufacture.

The present invention in effect is the first to provide an effective filter material having outstanding sorptive performance on the basis of a specific combination of chemisorptive and physisorptive properties which is specifically endowed with an activated carbon enhanced with a metallic component comprising an ionic liquid (IL). The present invention is equally the first to provide efficient methods of producing such materials. Materials of this kind, which combine all the aforementioned properties, have hitherto not been produced and/or described in the prior art.

The present invention provides an effective filter material having reactive and catalytic properties which, moreover, is inexpensive to produce and has a broad adsorptive spectrum. One possible use is in particular in single filters or combination filters, in particular on the basis of ABEK filters and/or in the context of NBC protection. A use in the form of loose beds and/or mixed beds can equally be realized.

It is equally possible in the context of the present invention for the reactively/catalytically enhanced activated carbon used in the filter material of the present invention to be combined with at least one further, additional sorbent/adsorbent, in particular an activated carbon based sorbent/adsorbent, i.e., the activated carbon used in the filter material of the present invention can be used together with a further sorbent/adsorbent, in particular an activated carbon based sorbent/adsorbent, for example in the context of providing sorptive filter materials and the like. For instance, the activated carbon used in the filter material of the present invention can be combined with an ABEK activated carbon well known to those skilled in the art, in particular in order that the sorption spectrum may be supplemented/complemented/widened on this basis.

The reactive/catalytic enhancement of the activated carbon with metal-containing ionic liquids (ILs), which contain metal ions in particular, facilitates degradation/neutralization of chemical and/or biological poisons and/or noxiants and also of undesirable/noxiant or toxic gases. The enhancement of the activated carbon can thereby also be modulated such that the resulting activated carbon used in the filter material of the present invention additionally has a biostatic and/or biocidal effect, in particular a bacteriostatic or bactericidal and/or virustatic or virucidal and/or a fungistatic or fungicidal effect.

The present invention will now be more particularly elucidated with reference to drawings/figures depicting preferred embodiments by way of example. In the course of these preferred embodiments of the present invention, which are not in any way limiting for the present invention, being elucidated, further advantages, properties, aspects and features of the present invention will also be described.

Figure 2:
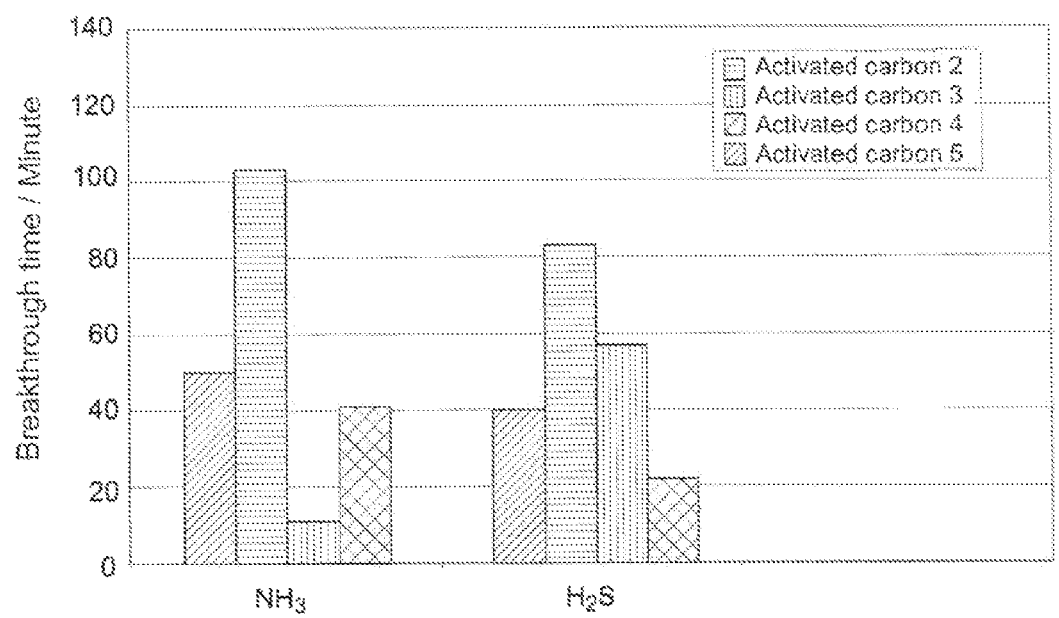
FIG. 2 provides graphical depictions featuring a comparison of the breakthrough times under ABEK conditions for the gases ammonia ($NH_3$) and hydrogen sulfide ($H_2S$), wherein the activated carbon used according to the present invention and based on a metallic component comprising a metal-containing ionic liquid (IL) is represented by activated carbon 2, while activated carbons 3 to 5 represent noninventive activated carbons.
Figure 3:
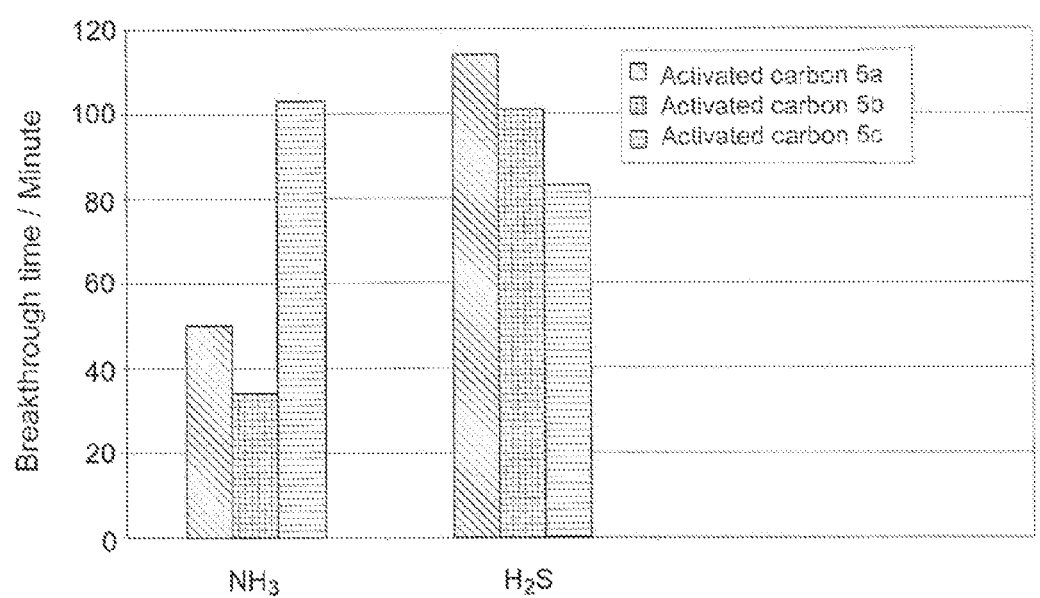
FIG. 3 provides graphical depictions featuring a comparison of breakthrough times under ABEK conditions for three activated carbons used according to the present invention (activated carbons 5a, 5b and 5c) and differing in the composition of the metallic component through use of different ionic liquids (ILs), metal salts and molar ratios between the ionic liquid (IL) on the one hand and the metal salt on the other.
Figure 4:
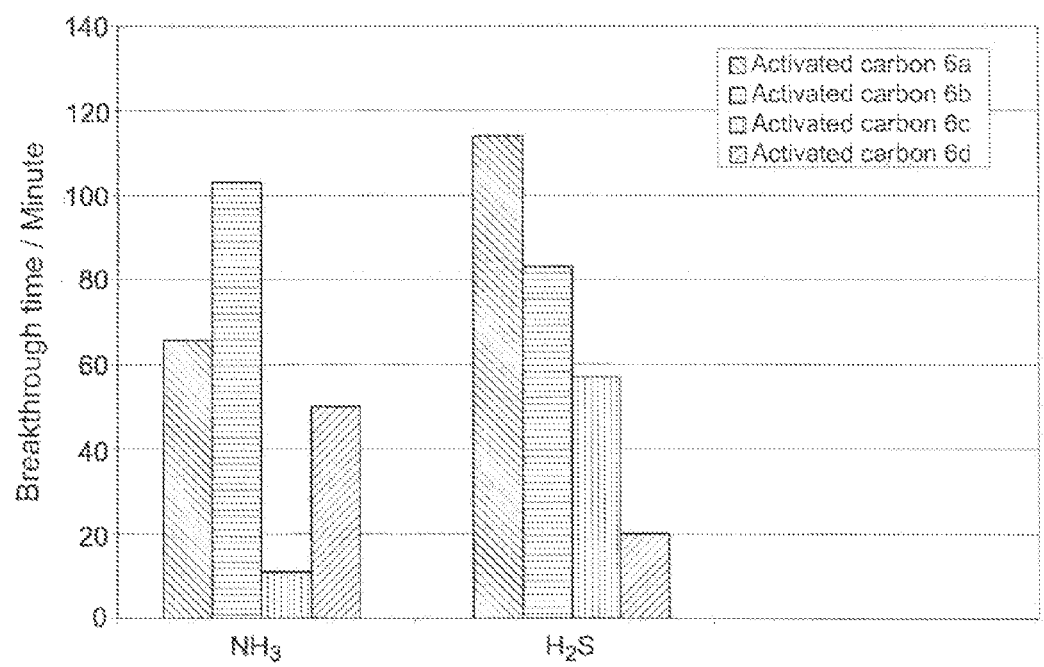
FIG. 4 provides graphical depictions and a comparison of breakthrough times of activated carbons used according to the present invention (activated carbon 6a and activated carbon 6b) versus noninventive activated carbons (activated carbon 6c and activated carbon 6d).

The drawings show in:

FIG. 1 a graphical depiction of the breakthrough curves of ammonia ($NH_3$) for beds of an activated carbon used according to the present invention (activated carbon 1) and including a metallic component comprising a metal-containing ionic liquid (IL) in comparison with a noninventive activated carbon (activated carbon 1') conventionally impregnated with metal salt;

FIG. 2 graphical depictions featuring a comparison of the breakthrough times under ABEK conditions for the gases ammonia ($NH_3$) and hydrogen sulfide ($H_2S$), wherein the activated carbon used according to the present invention and based on a metallic component comprising a metal-containing ionic liquid (IL) is represented by activated carbon 2, while activated carbons 3 to 5 represent noninventive activated carbons;

FIG. 3 graphical depictions featuring a comparison of breakthrough times under ABEK conditions for three activated carbons used according to the present invention (activated carbons 5a, 5b and 5c) and differing in the composition of the metallic component through use of different ionic liquids (ILs), metal salts and molar ratios between the ionic liquid (IL) on the one hand and the metal salt on the other;

FIG. 4 graphical depictions and a comparison of breakthrough times of activated carbons used according to the present invention (activated carbon 6a and activated carbon 6b) versus noninventive activated carbons (activated carbon 6c and activated carbon 6d).

FIG. 1 shows a schematic depiction and a comparison of the breakthrough curves of ammonia ($NH_3$) of an activated carbon used according to the present invention (activated carbon 1) versus a noninventive activated carbon (activated carbon 1'). The activated carbons in question were each used in the form of beds. The activated carbon used according to the present invention utilized a metallic component containing 1-ethyl-3-methylimidazolium chloride as ionic liquid (IL) and $CuCl_2$ as metal compound. The molar ratio therein of ionic liquid (IL) to the metal compound was [1:1.3] at a pore-filling degree $\alpha=0.2$. The metallic component thus used in relation to the activated carbon used according to the present invention was [EMIM]Cl—$CuCl_2$ (1:1.3) with $\alpha=0.2$. The starting activated carbon used for the impregnation was a high micro- and mesoporous activated carbon commercially available from Blucher GmbH. The noninventive activated carbon used was an activated carbon having identical porosity and conventionally impregnated with $CuCl_2$ salt. FIG. 1 shows the distinctly greater breakthrough times obtained for $NH_3$ with activated carbon 1 used according to the present invention. The activated carbon used according to the present invention thus performs significantly better than activated carbons with conventional impregnation. The breakthrough curves were recorded with the following parameters/settings: gas humidity rH=25%, Cu loading=0.001567 mol/g, $T_{adsorber}=30°$ C. $P_{adsorber}=1.21$ bar, $h_{bed}=2$ cm, nitrogen volume flow=325.61 $ml_{STP}$/min, $NH_3$ volume flow=0.33 $ml_{STP}$/min, $NH_3$ detection limit c=39 ppm. The ordinate shows the quotient formed from the inlet and outlet concentrations of ammonia.

The depiction as per FIG. 2 shows a schematic comparison of the breakthrough times of the gases ammonia ($NH_3$) and hydrogen sulfide ($H_2S$) under ABEK conditions of an activated carbon used according to the present invention (activated carbon 2) versus noninventive activated carbons (activated carbons 3 to 5). The activated carbon used according to the present invention is a highly micro- and mesoporous starting activated carbon from Blücher GmbH, endowed with a metallic component based on [EMIM]Cl—$CuCl_2$. Activated carbon 3 is a comparative activated carbon with conventional military-grade impregnation, activated carbon 4 is a conventional activated carbon with ABEK impregnation and activated carbon 5 is a conventional activated carbon with ABEK impregnation. The bar chart shows that the activated carbon used according to the present invention provides distinctly greater breakthrough times both for ammonia ($NH_3$) and for hydrogen sulfide ($H_2S$). The sorptive performances of the activated carbon used according to the present invention are thus very good, especially in respect of $NH_3$ and $H_2S$.

The corresponding values were determined at the following parameters/settings: a) breakthrough measurements for $NH_3$: gas humidity rH=85±5%, $T_{adsorber}$=30° C. $h_{bed}$=2 cm, sample quantity: about 2 g, $NH_3$ detection limit c=$^{39}$ $ppm_V$, $C_{NH3}$=1000 ppm of $NH_3$ ($N_2$), b) breakthrough measurements for $H_2S$: gas humidity rH=70%, $T_{adsorber}$ 20° C. $h_{bed}$ 2 cm, $d_{bed}$=50 mm, $C_{H2S}$=1000 ppm of $H_2S$, $H_2S$ flow velocity=0.1 m/s, $H_2S$ breakthrough=10 ppm. The above-mentioned parameters were also set in the embodiments/tests as per FIG. 3 and FIG. 4.

The depiction as per FIG. 3 in turn shows a comparison of the breakthrough times for three different activated carbons used according to the present invention in relation to the sorption of ammonia ($NH_3$) and hydrogen sulfide ($H_2S$). Activated carbon 5a used according to the present invention is a highly micro- and mesoporous starting activated carbon from Blücher GmbH, enhanced with a metallic component based on 1-ethyl-3-methylimidazolium acetate as ionic liquid (IL) and zinc acetate as metal compound or metal salt. The aforementioned components were used in a molar ratio of [1:1]. The pore-filling degree α was 0.2 ([EMIM]Ac—$ZnAc_2$ (1:1 molar) with α=0.2). Activated carbon 5b used according to the present invention was similarly a highly micro- and mesoporous starting activated carbon from Blücher GmbH, which equally contained 1-ethyl-3-methylimidazolium acetate as metallic component. The pore-filling degree α was equally 0.2. The metal compound/metal salt used was tin acetate in a molar ratio of [1:1] ([EMIM]Ac—$SnAc_2$ (1:1 molar) with α=0.2). Activated carbon 5 was equally a highly micro- and mesoporous starting activated carbon from Blucher GmbH; the metallic component was based on 1-ethyl-3-methylimidazolium chloride as ionic liquid (IL) and copper chloride ($CuCl_2$) as metal compound or metal salt; the molar ratio was [1:1.3]. Activated carbon 5c was also adjusted to a pore-filling degree α of 0.2 ([EMIM]Cl—$CuCl_2$ (1:1.3) with α=0.2). All the activated carbons used according to the present invention distinctly exceed the standardized sorptive performance requirements both in respect of ammonia ($NH_3$) and in respect of hydrogen sulfide ($H_2S$). Activated carbon 5c gives particularly good results in respect of $NH_3$, while activated carbon 5a gives the best results as regards the sorption of $H_2S$. Altogether, the sorption behavior of all the activated carbons used according to the present invention must be rated outstanding.

Finally, the depiction as per FIG. 4 shows a graphical depiction featuring a comparison of ammonia ($NH_3$) and hydrogen sulfide ($H_2S$) breakthrough times for activated carbons 6a and 6b, used according to the present invention, versus noninventive activated carbons 6c and 6d. Activated carbon 6a, used according to the present invention, utilized for the metallic component 1-ethyl-3-methylimidazolium acetate as the ionic liquid (IL) and zinc acetate as the metal compound or metal salt ([EMIM]Ac—$ZnAc_2$). Activated carbon 6b, used according to the present invention, used a metallic component comprising 1-ethyl-3-methylimidazolium chloride as the ionic liquid and copper chloride ($CuCl_2$) as the metal compound or metal salt ([EMIM]Cl—$CuCl_2$). Noninventive activated carbon 6c was an activated carbon with military-grade impregnation and noninventive activated carbon 6d was an ABEK activated carbon. FIG. 4 illustrates that not only activated carbon 6a, used according to the present invention, but also activated carbon 6b, used according to the present invention, have distinctly better sorptive properties than the prior art activated carbons not only in relation to ammonia ($NH_3$) but also in relation to hydrogen sulfide ($H_2S$), as is evidenced by significantly greater breakthrough times.

The adduced studies provide conclusive verification of the outstanding sorptive properties on the part of the activated carbon used according to the present invention, including in particular the aspect of a large bandwidth in respect of the noxiant gases/substances to be sorbed.

The diagrams elucidated above will also be further elucidated once more in the context of the exemplary embodiments of the present invention.

Further versions, alterations, variations, modifications, special features and advantages of the present invention will be readily apparent to and realizable by the ordinarily skilled on reading the description without their having to go outside the realm of the present invention.

The present invention is illustrated by the following exemplary embodiments which, however, shall in no way limit the present invention.

EXEMPLARY EMBODIMENTS

1. Production of Activated Carbon Enhanced According to the Present Invention a) Producing the Metallic Component Based on an Ionic Liquid (IL) and a Metal Compound Synthesis of Chlorometallate/Ionic Liquid (IL) Melts The syntheses of the metallic component (=chloro-metallate/ionic liquid (IL)) were all carried out under an inert gas atmosphere.

The first step in producing the metallic components used, in particular on the basis of chlorometallate/ionic liquid (IL) melts, was to compute the masses to be weighed out of the particular ionic liquid (IL) and of copper(II) chloride ($CuCl_2$).

The corresponding amount of ionic liquid (IL) was then introduced into a dry Schlenk flask.

The structure formulae of the ionic liquids (ILs) used in this connection, viz., 1-ethyl-3-methylimidazolium chloride ([EMIM]Cl), 1-butyl-3-methylimidazolium chloride ([BMIM]Cl) and 1-octyl-3-methylimidazolium chloride ([OMIM]Cl), are shown in the illustration hereinbelow.

The next step was to weigh out that molar fraction of $CuCl_2$ which was computed to establish the particular molar ratio of ionic liquid (IL) to $CuCl_2$.

The melt was then stirred in a Schlenk flask for 24 h under an inert gas atmosphere at T=100° C. in an oil bath at a stirrer speed of 300 min⁻¹.

This was followed by overnight drying under a high vacuum.

The illustration hereinbelow shows the ionic liquids used in the exemplary embodiments for producing the chlorometallate/ionic liquid (IL) melts:

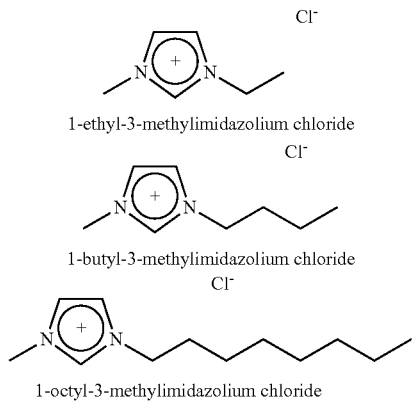

1-ethyl-3-methylimidazolium chloride 1-butyl-3-methylimidazolium chloride 1-octyl-3-methylimidazolium chloride Table 1 below lists the synthesized melts and their molar, amount-of-substance compositions.

TABLE 1

| Synthesized chlorometallate/ionic liquid (IL) melts | |
|---|---|
| ionic liquid (IL) | molar ratio [ionic liquid (IL):CuCl$_2$] |
| [EMIM]Cl | [1:1]; [1:1.3] |
| [BMIM]Cl | [1:1] |
| [OMIM]Cl | [1:1]; [1:1.3]; [1:1.6] |

To compute the volumes to be used of the ionic liquid (IL) for the subsequent production of the activated carbon enhanced according to the present invention, the specific densities of the melts obtained were measured in a helium pyknometer (Pycnomatic ATC from Thermo Scientific).

The specific densities of the melts are listed below in Table 2.

TABLE 2

| Results of specific density measurements in helium pyknometer at T = 20° C. | |
|---|---|
| melt | specific density/g cm⁻³ |
| [EMIM]Cl—CuCl$_2$ [1:1] | 1.8137 |
| [EMIM]Cl—CuCl$_2$ [1:1.3] | 1.8090 |
| [BMIM]Cl—CuCl$_2$ [1:1] | 1.5846 |
| [OMIM]Cl—CuCl$_2$ [1:1] | 1.3050 |
| [OMIM]Cl—CuCl$_2$ [1:1.3] | 1.5085 |
| [OMIM]Cl—CuCl$_2$ [1:1.6] | 1.6607 | b) Enhancing the Activated Carbon with the Metallic Component Based on an Ionic Liquid (IL) and a Metal Compound Preparation of Activated Carbon Enhanced According to the Present Invention/Production by Ultrasonication:

The carrier material used for producing the activated carbon used according to the present invention was a micro/mesoporous activated carbon or a mesoporous activated carbon. The starting activated carbons used according to the present invention are available from Blücher GmbH, Erkrath (Germany) under article numbers 101408 (micro/mesoporous activated carbon) and 101412 (mesoporous activated carbon), respectively.

The activated carbon adsorbents were impregnated with the chlorometallate/ionic liquid (IL) melts by ultrasonication. Improved distribution of the metallic component in the fine porous structures of the activated carbon carrier was ensured by the non-steady-state/discontinuous input of energy due to the ultrasonic probe.

To produce the activated carbon used according to the present invention, the first step was to compute the quantity which is needed of the metallic component to establish a certain pore-filling degree α for a defined amount of activated carbon adsorbent. This pore-filling degree α was computed as per the formula $[\alpha = (V_{pore} \cdot m_{carrier})]$. In the aforementioned formula, "$V_{IL}$" designates the volume of the ionic liquid (IL) used, "$m_{carrier}$" designates the mass of the activated carbon to be used and "$V_{pore}$" designates the specific (mass-based) pore volume of the activated carbon.

The particular metallic component based on the chlorometallate/ionic liquid (IL) melt was first weighed into a dry Schlenk flask and dissolved/diluted in ethanol (absolute). The dissolving operation was effected by stirring on a magnetic stirrer at a stirring speed of $v_{stirrer}$=200 min⁻¹ under an inert gas atmosphere. The duration of this operation was between t=10 min and several hours and was dependent on the metallic component to be dissolved. Thereafter, the previously computed amount of activated carbon adsorbent was introduced into the solution. The mixture was stirred for a further 15 minutes and then placed for 2 h in a waterbath with an immersed ultrasonic probe.

The apparatus used here for ultrasound-augmented production of the activated carbon enhanced according to the present invention included a waterbath, a Schlenk synthesis flask and an ultrasonic probe (UP200S (200 W, 24 kHz) from Hielscher). The Schlenk flask filled with the synthesis batch and the ultrasonic probe were dipped into the waterbath. The pulses of ultrasound emitted by the ultrasonic probe at intervals of t=0.5 s had a 50% amplitude setting.

After impregnation of the activated carbon carrier, the ethanol solvent was separated off in a rotary evaporator at T=40° C. and p=175 mbar, and the subsequent final drying took place under high vacuum in an oil bath at T=60° C. overnight.

2. Production of Noninventive Activated Carbon on the Basis of Conventional CuCl$_2$ Salt Enhancement In addition to the activated carbons enhanced according to the present invention, impregnations of the activated carbon carriers with pure CuCl$_2$ salt were also produced. The preparation was carried out similarly to the just described production of the activated carbon used according to the present invention. The CuCl$_2$ fraction to be weighed out was based on the equivalent copper metal fraction of the pertinent system AC (micro/meso)+[EMIM]Cl—CuCl$_2$ (1:1.3) α=0.2 per gram of AC (AC=activated carbon) (corresponding to 0.001567 mol g⁻¹ of Cu on activated carbon carrier).

Tables 8 and 9 hereinbelow summarize all the ultrasound-assistedly produced activated carbons as used according to the present invention and CuCl$_2$-impregnated activated carbon adsorbents (comparator).

3. Plant Construction and Measurement of Breakthrough Curves in the Plant for Continuous Adsorption of Noxiant Gases First, the breakthrough curves of ammonia for activated carbon systems used according to the present invention were measured in a plant for continuous ammonia adsorption using a carrier gas stream whose humidity could be varied. The settings for the operating parameters of the plant reproduce, as closely as possible, the actual in-service ambient conditions for a possible use in respirators of the activated carbon enhanced according to the present invention.

The operating parameters and also the plant construction and the experimental procedure for continuous gas adsorption will now be considered in more detail:

a) Construction of Plant for Continuous Ammonia Adsorption

The plant for continuous ammonia adsorption using a variably humidifiable gas stream, in particular the plant construction for the irreversible adsorption of ammonia from a variably humidifiable stream of nitrogen, included mass flow controllers (MFCs) (1) and (2) for $NH_3$ and $N_2$ respectively, (3) a gas saturation unit, (4) a thermostat, (5) a humidity-measuring unit (rHI-TI-1 or HND-FF31 from Huber), (6) a bypass, and (7) adsorber.

The mass flow controllers (MFCs) (1) and (2) were used to establish a defined concentration of 1000 $ppm_V$ of ammonia ($NH_3$) in a nitrogen carrier gas stream. Valve settings could be varied to pass the gas mixture through the plant either dry or humidified, as a matter of choice. To humidify the gas mixture, the nitrogen stream was passed into the saturation unit (3). The gas saturator rests on the principle of a traditional gas wash bottle but has a double-wall construction. It makes it possible to temperature-regulate the inner water column, through which the nitrogen flows, by means of a thermostat/cryostat circuit. The establishment of low gas humidities needed low water temperatures. These were achieved by using a thermo/cryostat (Ecoline Staredition RE 106 from Lauda). Depending on the temperature setting, a certain proportion of the twice-distilled water is vaporized and carried along by the nitrogen stream. This adjusted the gas stream to the desired relative humidity, which was detected in a reservoir (5) by the humidity sensor or measuring unit. Following the admixture of the ammonia, the gas mixture could as a matter of choice be routed through the bypass circuit (6) past the adsorber (7) or, at the beginning of a run, through the adsorber (7). The gas stream thereafter passed into the downstream analytical system. It is further described in the Analysis section.

The settings for the operating parameters involving the continuous adsorption of gas always remained the same to simulate the ambient conditions in respirators. To give a better overview, these are listed in Table 3 which follows:

TABLE 3

Operating parameters of plant for continuous gas adsorption of ammonia

| | |
|---|---|
| $N_2$ volume flow/$ml_{STP}$ $min^{-1}$ | 325.61 |
| $NH_3$ volume flow/$ml_{STP}$ $min^{-1}$ | 0.33 |
| bed inflow velocity/cm $s^{-1}$ | 2 |
| bed height/cm | 2 |
| bed diameter/cm | 1.8 |
| plant pressure/bar | 1.21 |

The experimental procedure was generally carried out at a temperature of 30° C., except that it was raised to T=85° C. to conduct the reversibility tests.

In order that the activated carbon enhanced according to the present invention may be optimized for the adsorption of ammonia in particular, the relative gas humidity was varied from rH=0% to rH=85%. The relative humidities under adsorber conditions (p=1.21 bar, T=30° C.) were computed using the Clausius-Clapeyron equation. The temperature on the inside of the saturator was measured by means of a temperature sensor.

The temperature settings at the thermo/cryostat which were needed to set the relative gas humidity are shown in Table 4 which follows:

TABLE 4

Temperature setting at thermostat/cryostat to vary the relative humidity

| thermostat/cryostat temperature/° C. | relative humidity/% |
|---|---|
| 13.0 | 25 |
| 21.9 | 50 |
| 27.5 | 70 |
| 33.0 | 85 | b) Experimental Procedure for Measuring the Continuous Adsorption of Ammonia

The plant was initially purged with a dry stream of $N_2$ gas via the bypass. Concurrently, the adsorber was charged with the activated carbon bed to be measured. In order for the adsorber layer to form a packing, the activated carbon bed was applied to the metal frit in the reactor between two thin layers of glass wool. Valves located at predetermined positions of the apparatus used were then adjusted to purge the bed with the dry stream of nitrogen until solvent residues could no longer be detected.

The valves were then switched over again to the bypass setting to establish steady-state experimental conditions. For the humid measurement, the nitrogen carrier gas was passed through the saturator unit at a volume flow rate of 325.61 $ml_{STP}$ $min^{-1}$ and, as described above, humidified in the process. The MFC for admixture of $NH_3$ was further adjusted to a volume flow of 0.33 $ml_{STP}$ $min^{-1}$. Downstream of the point of mixing the two gas components, the ammonia concentration in the bypass stream was 1000 ppm.

As soon as steady-state conditions of operation were established, the valves were switched to pass the gas mixture through the adsorber at a bed inflow velocity of v=2 cm $s^{-1}$. After detection of the breakthrough curve, the ammonia gas stream was switched off. In addition, the bed of activated carbon was purged with a dry stream of nitrogen. After the adsorber had been purged, the bypass setting was reselected and the bypass purged with dry nitrogen. The adsorber was subsequently emptied and refilled.

c) Reversibility Tests

To conduct reversibility tests, attainment of the saturation concentration was followed by terminating the supply of ammonia and raising the adsorber temperature. To check for reversible adsorption of ammonia in the bed, the adsorber was heated up to an actual value of about $T_{adsorber}$=85° C. The reversibility test was complete as soon as ammonia was no longer detectable in the gas stream flowing out of the bed. The further steps of purging the reactor and the bypass were carried out as already described.

Analysis

Specific Density Measurements:

The specific density measurements of the metallic component (metal-containing ionic liquid (IL)) at T=20° C. were carried out under helium in a Pycnomatic ATC pyknometer from Thermo Scientific.

Ammonia Detection:

To determine the breakthrough curves of ammonia, the gas components exiting from the adsorber were continuously measured using a gas chromatograph (CP-3800 from Varian). The gas components were separated in a capillary column (WCOT Fused silica (60 m×0.32 mm) CP-Volamine from Varian). The ammonia concentration detection limit was 39 ppm.

Thermogravimetric Analyses:

The thermogravimetric measurements were carried out using a Setsys-1750 CS Evolution instrument from Setaram Instrumentation KEP Technologies. The samples were heated up across the temperature range from T=30° C. to T=950° C. Activated carbons were further subjected to long-term tests at T=100° C. or 200° C. for t=10 h. The decomposition temperatures of the metallic components used were above 200° C. They also exhibited very high thermal long-term stabilities at the temperatures measured.

Sorption Measurements:

The determination of the BET surface areas and of the pore volumes of the activated carbons was realized in the Quadrasorb SI (Automated Surface Area & Pore Size Analyzer) from Quantachrome Instruments.

Specifications of Employed Activated Carbon Adsorbents, Chemicals and Instruments:

TABLE 5

Specifications of employed activated carbon adsorbents from Blücher

| parameter | meso | meso/micro |
|---|---|---|
| $\rho/g\ ml^{-1}$ | 2.30797 | 2.22126 |
| $\rho_{bed}/g\ ml^{-1}$ | 0.411 | 0.412 |
| $S_{BET}/m^2\ g^{-1}$ | 1698.51 | 2004.96 |
| $V_P/cm^3\ g^{-1}$ | 1.1429 | 1.071 |
| $S_{micro}/m^2\ g^{-1}$ | 1508 | 1757 |
| $V_{P,\ micro}/cm^3\ g^{-1}$ | 0.6816 | 0.7702 |
| $Dd_P/Å$ | 27.5 | 24.7 |

TABLE 6

Specifications of chemicals used

| designation | purity | manufacturer | article number |
|---|---|---|---|
| ammonia | 3.8 | Linde | — |
| [BMIM]Cl | >98% | Aldrich-Chemistry | 94128 |
| [EMIM]Cl | for synthesis | Merck | 4.90054.0100 |
| [OMIM]Cl | for synthesis | Merck | 4.90056.1000 |
| ethanol absolute | >99.9% | Sigma-Aldrich | 34963 |
| copper(II) chloride | >98% | Merck | 8.18247.0500 |

TABLE 7

Specifications of important plant components

| designation | type | manufacturer | specification |
|---|---|---|---|
| MFC-NH$_3$ | F-200CV-002-RGD-11-E | Bronckhorst | 0.02-1 ml$_{STP}$ min$^{-1}$ |
| MFC-N$_2$ | F-201CV-500RGD-33-V | Bronckhorst | 8-400 ml$_{STP}$ min$^{-1}$ |
| GC column NH$_3$ | WCOT Fused Silica; Coating CP-Volamine | Varian | CP7448 60 m × 0.32 mm |
| humidity sensor | HND-FF31 | Kobold | 0.0-100.0% rH, 40.0-100.0° C. |
| thermo/cryostat | Ecoline Staredition RE106 | Lauda | — | d) Experimental Results/Breakthrough Curves

1. First, breakthrough curves of NH$_3$ in beds of activated carbon enhanced according to the present invention ([EMIM]Cl—CuCl$_2$ (1:1.3) α=0.2 on activated carbon adsorbents (micro/meso) were recorded at varying relative gas humidity (with T$_{adsorber}$=30° C., P$_{adsorber}$=1.21 bar, h$_{bed}$=2 cm, volume flow (N$_2$)=325.61 ml$_{STP}$ min$^{-1}$, volume flow (NH$_3$)=0.33 ml$_{STP}$ min$^{-1}$, detection limit C$_{NH3}$=39 ppm$_V$).

Varying the relative gas humidity for the activated carbon system comprising [EMIM]Cl—CuCl$_2$ (1:1.3) α=0.2 on highly micro- and mesoporous activated carbon adsorbents at relative humidities of rH=25%, 50% and 70% showed a significant improvement in the breakthrough times. The breakthrough times measured were about 30% above those at relative gas humidities of rH=0% and 85%. The breakthrough times in the humidity range between rH=25% to rH=70% are relatively similar. Since this is the range for the customary air humidities in the common use of respirators, the activated carbon used according to the present invention can be said to possess very good stability.

2. Similarly, breakthrough curves of NH$_3$ in beds of activated carbons enhanced according to the present invention ([OMIM]Cl—CuCl$_2$ (1:1.3) on differingly porous activated carbon adsorbents were determined at varying pore-filling degrees α (with T$_{adsorber}$=30° C., p$_{adsorber}$=1.21 bar, rH=85%, h$_{bed}$=2 cm, volume flow (N$_2$)=325.61 ml$_{STP}$ min$^{-1}$, volume flow (NH$_3$)=0.33 ml$_{STP}$ min$^{-1}$, detection limit c$_{NH3}$=39 ppm).

The resulting breakthrough curves revealed that at high loadings with the metallic component, or pore-filling degrees of α=0.4, mesoporous activated carbon adsorbents are more useful as carrier material than the micro/mesoporous activated carbon carriers. At the same pore-filling degree α=0.4, the mesoporous activated carbon carrier gives an approximately 26% higher breakthrough time of around 370 min. At lower pore-filling degrees of α=0.2, no serious difference can be made out between the breakthrough times between the activated carbon adsorbent types in question.

3. In addition, reversibility tests were carried out with adsorbed/desorbed NH$_3$ mass flows in the course of measuring the activated carbon system enhanced according to the present invention ([EMIM]Cl—CuCl$_2$ (1:1.3) α=0.2 on activated carbon adsorbents (micro/meso)) (with the following parameters: 1.) adsorption: T$_{adsorber}$=30° C., p$_{adsorber}$=1.21 bar, rH=50%, h$_{bed}$=2 cm, volume flow (N$_2$)=325.61 ml$_{STP}$ min$^{-1}$, volume flow (NH$_3$)=0.33 ml$_{STP}$ min$^{-1}$, detection limit c$_{NH3}$=39 ppm$_V$; 2.) desorption: $T_{adsorber}$=85° C., $p_{adsorber}$=1.23 bar, rH=50%, $h_{bed}$=2 cm, volume flow (N$_2$)=325.61 ml$_{STP}$ min$^{-1}$, detection limit $C_{NH3}$=39 ppm$_V$).

The reversibility tests were carried out to check the irreversible gas adsorption of ammonia in the bed. The adsorbed amount of ammonia in the bed during the adsorption run and also the desorbed amount of ammonia from the bed during the reversibility run were plotted against time. The two curves were integrated to compute the ammonia quantities imbibed by the bed during the adsorption and also the ammonia quantities desorbed during the reversibility test.

The total amount of adsorbed NH$_3$ with the activated carbon system enhanced according to the present invention ([EMIM]Cl—CuCl$_2$ (1:1.3) α=0.2 on activated carbon adsorbents (micro/meso)) was 225 mg of NH$_3$. Of that quantity, 128 mg of NH$_3$ desorbed again during the reversibility test. Therefore, around 43% of the NH$_3$ gas became irreversibly bound in the material during the adsorption run, an outstanding value.

The irreversible/chemisorptive binding of the ammonia is believed—without wishing to be tied to this theory—to take place due to a complex-forming reaction. The complex formed is a copper(II) tetramine complex formed by the ammonia binding to the copper species in the metallic component.

4. Comparison of activated carbon enhanced according to the present invention with activated carbon based on a conventional CuCl$_2$ enhancement:

FIG. 1 shows a comparison of the breakthrough curves for NH$_3$ in beds of activated carbon enhanced according to the present invention ([EMIM]Cl—CuCl$_2$ (1:1.3) α=0.2 on activated carbon adsorbents (micro/meso)) with conventional CuCl$_2$ salt impregnations on activated carbon adsorbents (micro/meso) (with the following parameters: gas humidity rH=25%, copper loading: 0.001567 mol g$^{-1}$, $T_{adsorber}$=30° C., $p_{adsorber}$=1.21 bar, $h_{bed}$=2 cm, volume flow (N$_2$)=325.61 ml$_{STP}$ min$^{-1}$, volume flow (NH$_3$)=0.33 ml$_{STP}$ min$^{-1}$, detection limit $C_{NH3}$=39 ppm$_V$).

Comparing the coppered activated carbon based on the enhancement according to the present invention with the conventional enhancements of activated carbon adsorbents with pure CuCl$_2$ salt shows, as depicted in FIG. 1, a distinct prolongation of breakthrough times for the system enhanced according to the present invention versus the pure metal salt impregnation at a relative gas humidity of rH=25%.

The systems enhanced according to the present invention were also found to give better, i.e., greater, breakthrough times in the course of further measurements at a relative gas humidity of rH=85%.

The results demonstrate altogether the appreciably improved effectiveness of the activated carbon enhanced according to the present invention over conventional copper metal salt impregnations irrespective of the prevailing air humidity.

The underlying experiments show conclusively and summarizingly the outstanding adsorptive properties of the combined chemisorptive and physisorptive activated carbons used for the filter material of the present invention, in keeping with very good breakthrough times and improved desorptive behavior.

4. Further Modes of Loading Copper on Activated Carbon Adsorbents

TABLE 8

Activated carbon systems produced with inventive enhancement
and conventional CuCl$_2$ salt impregnation on micro/mesoporous
activated carbon adsorbents with ultrasonication
Activated carbon carrier (micro/mesoporous)

| AC impregnation | pore-filling degree α (ml of IL/ml of pore) | n Cu (mol)/m AC (g) |
|---|---|---|
| [EMIM]Cl—CuCl$_2$ (1:1) | 0.2 | 0.001382 |
| [EMIM]Cl—CuCl$_2$ (1:1) | 0.4 | 0.002764 |
| [EMIM]Cl—CuCl$_2$ (1:1.3) | 0.2 | 0.001567 |
| [EMIM]Cl—CuCl$_2$ (1:1.3) | 0.4 | 0.003135 |
| [BMIM]Cl—CuCl$_2$ (1:1) | 0.4 | 0.002196 |
| [OMIM]Cl—CuCl$_2$ (1:1) | 0.4 | 0.001531 |
| [OMIM]Cl—CuCl$_2$ (1:1.3) | 0.2 | 0.001036 |
| [OMIM]Cl—CuCl$_2$ (1:1.3) | 0.4 | 0.002072 |
| [OMIM]Cl—CuCl$_2$ (1:1.6) | 0.4 | 0.002553 |
| CuCl$_2$ | — | 0.001567 |

TABLE 9

Activated carbon systems produced with inventive enhancement
and conventional CuCl$_2$ salt impregnation on mesoporous
activated carbon adsorbents with ultrasonication
Activated carbon carrier (mesoporous)

| AC impregnation | pore-filling degree α (ml of IL/ml of pore) | n Cu (mol)/m AC (g) |
|---|---|---|
| [OMIM]Cl—CuCl$_2$ (1:1.3) | 0.2 | 0.001103 |
| [OMIM]Cl—CuCl$_2$ (1:1.3) | 0.4 | 0.002211 |

5. Further Examples of Loading Different Base Carrier Materials with Metal-Containing Ionic Liquid (IL) and Various Comparators Different porous particulate carrier materials
(1) based on the micro- and mesoporous activated carbon used according to the present invention (invention),
(2) based on silicon dioxide (comparator),
(3) based on zeolite (comparator),
(4) based on alumina (comparator), and
(5) based on ion exchangers (comparator)
were each treated/impregnated with metal-containing ionic liquid (IL) of the [EMIM]Cl—CuCl$_2$ (1:1.3) type (see above) to the same pore-filling degree in each case.

The adsorbents thus obtained were subsequently fixed in a conventional manner on a gas-permeable three-dimensional support in the form of an open-pore reticulated polyurethane foam. This support loaded with adsorbents served as a filter material (cylindrical test specimens each 10 cm in diameter and 30 cm in height) in the subsequent breakthrough tests.

Further comparative filter materials were produced using adsorbents
(6) based on a micro- and mesoporous activated carbon with ABEK impregnation (comparator), and
(7) based on a micro- and mesoporous activated carbon without any impregnation whatsoever (comparator).

Under the aforementioned experimental conditions, breakthrough times were determined for each of different noxiant gases (NH$_3$, H$_2$S and Cl$_2$) under the conditions described above. The values are shown below in Table 10.

TABLE 10

Breakthrough times in a comparison of filter materials comprising various adsorbents

| adsorbent | mean breakthrough time in min for $NH_3$ | mean breakthrough time in min for $H_2S$ | mean breakthrough time in min for $Cl_2$ |
|---|---|---|---|
| (1) IL-impregnated activated carbon (invention) | 522 | 489 | 493 |
| (2) silica (comparator) | 89 | 72 | 55 |
| (3) zeolite (comparator) | 243 | 212 | 198 |
| (4) alumina (comparator) | 134 | 121 | 112 |
| (5) ion exchanger (comparator) | 232 | 197 | 209 |
| (6) ABEK-impregnated activated carbon (comparator) | 467 | 398 | 389 |
| (7) nonimpregnated activated carbon (comparator) | 228 | 189 | 276 |

The results show that the filter materials/adsorbents enhanced according to the present invention give the best values in respect of all the gases. The filter materials/adsorbents enhanced according to the present invention, despite identical impregnation, are significantly superior to other adsorbents based on different types of base/carrier material (silica (2), zeolite (3), alumina (4) and ion exchange resin (5)) in adsorptive performance—for different gases. The effectiveness of the filter materials/adsorbents enhanced according to the present invention even exceeds the adsorptive capability of identical starting activated carbon but with ABEK impregnation (6) and also of identical starting activated carbon without any impregnation (7).

6. Gas Conditioning for Cleanroom Conditions

Gas conditioning under cleanroom conditions in the prior art often utilizes iodide-impregnated activated carbons. An iodide-impregnated activated carbon of this type (hereinafter referred to as "$AC_{iodide}$") was in the context of the present test versus a micro- and mesoporous activated carbon used according to the present invention comprising an impregnation based on a metal-containing ionic liquid (IL) with ternary metal enhancement Zn/Sn/Cu of the type [EMIM]Ac—$ZnAc_2$/[EMIM]Ac—$SnAc_2$/[EMIM]Cl—$CuCl_2$ where "Ac"=acetate (hereinafter "$AC_{IL-Zn/Sn/Cu}$"). A further comparator used was a micro- and mesoporous activated carbon with conventional metal salt impregnation based on a ternary metal enhancement Zn/Sn/Cu of the type $ZnAc_2$/$SnAc_2$/$CuCl_2$ where "Ac"=acetate and thus without ionic liquid (IL) (hereinafter $AC_{Zn/Sn/Cu}$).

The various adsorbents were subsequently fixed in a conventional manner on a gas-permeable three-dimensional support in the form of an open-pore reticulated polyurethane foam. This support loaded with adsorbents served as a filter material (cylindrical test specimens each 10 cm in diameter and 30 cm in height) in the subsequent tests.

Under the aforementioned experimental conditions, adsorption behavior was determined for each of different noxiant gases ($SO_2$, $NO_x$ and $H_2S$, each at 1000 ppm inlet concentration) under the conditions described above.

The "$AC_{IL-Zn/Sn/Cu}$" filter material of the present invention lowered the concentration of all noxiant gases to below the limit of detection. This did not change even after a test period of 5 hours. A subsequent desorption test after an operating time of 5 hours did not yield any observable release of noxiant gases whatsoever.

By contrast, the "$AC_{iodide}$" comparative filter material only lowered the concentration of the sulfur and nitrogen oxides to below the limit of detection, whereas the hydrogen sulfide was adsorbed to an insufficient degree. The release of iodine was observed after a test period of just 3 hours. A subsequent desorption test after an operating time of 5 hours brought forth the release of significant amounts of the noxiant gases as well as iodine.

The "$AC_{Zn/Sn/Cu}$" comparative filter material did initially reduce the concentration of all noxiant gases to below the limit of detection; however, following a test period of 3.5 hours, first the hydrogen sulfide content but then also the content of sulfur and nitrogen oxides could no longer be lowered to below the limit of detection. A subsequent desorption test after an operating time of 5 hours released low yet detectable amounts of the noxiant gases.

The results show that the filter materials/adsorbents enhanced according to the present invention give the best values in respect of all the gases; only they ensure a durable/irreversible and adequate sorption throughout the entire test period—and this without the release of iodine and without desorption of the noxiant gases.

7. Use in Air Filters

A micro- and mesoporous activated carbon used according to the present invention was treated/impregnated with metal-containing ionic liquid (IL) of the [EMIM]Cl—$CuCl_2$ (1:1.3) type (see above). The adsorbents enhanced in this way were subsequently fixed in a conventional manner on a gas-permeable three-dimensional support in the form of an open-pore reticulated polyurethane foam, which was then integrated/installed in an air cleaner. Correspondingly, to provide comparative materials, a conventional activated carbon was fixed on a gas-permeable support as described above, which was then similarly integrated/installed in a corresponding air cleaner. The supports each laden with adsorbents were thus used as filter material in the following tests:

a) The air cleaners were each introduced into a room contaminated with polychlorinated biphenyls (PCBs) (PCB concentration: 10 000 ng/$m^3$) and started up. After just 1 hour of operation, the air cleaner comprising the filter material of the present invention reduced the PCB room air concentration to less than 300 ng/$m^3$, and subsequently maintained this value throughout the period of operation. The subsequent desorption test did not bring forth any significant PCB quantities. The air cleaner comprising the comparative material reduced the PCB room air concentration to about 1200 ng/$m^3$ in the course of 1 hour of operation; in the subsequent desorption test, the reversibility of the adsorption amounted to more than 95% (i.e., more than 95% of the previously adsorbed PCB was released again).

b) The particular air cleaners were also examined in the course of an $H_2S$ flowthrough test. For this, the bed height of the support used (open-pore reticulated polyurethane foam) with the adsorbents fixed thereto was 40 mm in each case. The concentration of $H_2S$ in the air stream was 10 ppm, and the flow velocity was set to 0.73 m/s. The efficiency was 80% for more than 1200 min. In the case of the conventional material, efficiency was less than 10%.

What is claimed is:

1. A filter material for use in or as a filter for gas treatment or gas cleaning;
wherein the filter material comprises at least one activated carbon provided with reactive or catalytic activity and a support material;
wherein the activated carbon is in the form of discrete activated carbon particles in spherical or granular form and is applied onto the support material, wherein the activated carbon is fixed to the support material;
wherein the activated carbon has a particle size in the range from 0.001 to 2 mm, as determined according to ASTM D2862-97/04;
wherein the activated carbon has a total pore volume in the range from 0.7 to 2.5 cm$^3$/g, wherein 30% to 85% of the total pore volume of the activated carbon is formed by pores having pore diameters in the range from 2 nm to 50 nm;
wherein the activated carbon has a specific BET surface area in the range from 500 m$^2$/g to 3,500 m$^2$/g;
wherein the activated carbon is provided with at least one metallic component, wherein the metallic component comprises at least one metal-containing ionic liquid (IL) and wherein the metallic component includes at least one metal compound dissolved or dissociated in the ionic liquid (IL), wherein the metal compound comprises at least one metal selected from the group consisting of Cu, Ag, Au, Zn, Hg, Sn, Ce, Ti, Zr, V, Nb, Cr, Mo, W, Mn, Fe, Ru, Os, Co, Rh, Ir, Ni, Pd and Pt;
wherein the ionic liquid (IL) is a compound of general formula [Kat]$^{n+}$[An]$^{n-}$, wherein "Kat" designates a cation and "An" designates an anion and "n" designates an integer equal to 1 or 2; or wherein the ionic liquid (IL) is a compound of general formula [Kat$_1$]$_x^{y+}$[An$_1$]$_y^{x-}$, wherein "Kat$_1$" designates a cation and "An$_1$" designates an anion and "x" and "y" each independently designate an integer from 1 to 4; wherein the cation of the ionic liquid (IL) is a nitrogen-containing cation selected from the group consisting of quaternary ammonium cations, imidazolium cations, pyridinium cations, pyrazolium cations and triazinium cations or a phosphorus-containing cation in the form of a phosphonium cation and wherein the anion of the ionic liquid (IL) is an organic or inorganic anion;
wherein the activated carbon includes the metal-containing ionic liquid (IL) in amounts of 1 vol % to 70 vol %, based on the volume of the activated carbon; or wherein the amount of metal-containing ionic liquid (IL), determined as the pore-filling degree, is such that 20% to 95% of the pore volume of the activated carbon is not filled with the metal-containing ionic liquid (IL),
wherein the pore-filling degree α is determined according to the formula [α=V$_{IL}$/(V$_{pore}$·m$_{support}$)] wherein "V$_{IL}$" designates the volume of the ionic liquid to be used, "m$_{support}$" designates the mass of the activated carbon to be used and "V$_{pore}$" designates the specific pore volume of the activated carbon.

2. The filter material as claimed in claim 1, wherein the metallic component includes the metal in a positive oxidation state, wherein the oxidation state of the metal lies in the range from +I to +VII.

3. The filter material as claimed in claim 1, wherein the metallic component includes at least one metal selected from the group of Zn, Ag, Sn, Ni and Cu.

4. The filter material as claimed in claim 1, wherein the metallic component includes an organic or inorganic metal salt, based on the metal, wherein the salt is selected from the croup of halide salts, sulfates, sulfides, sulfites, nitrates, nitrites, phosphates, phosphides, phosphites, carbamates, alkoxides and carboxylic acid salts.

5. The filter material as claimed in claim 1, wherein the metallic component includes a metal compound selected from the group of nickel chloride, copper chloride, zinc acetate and tin acetate.

6. The filter material as claimed in claim 1, wherein the ionic liquid (IL) contains the metal in amounts of 0.001 wt % to 80 wt %, based on the ionic liquid (IL) and calculated as metal.

7. The filter material as claimed in claim 1, wherein the ionic liquid (IL) contains the metal in a molar mass fraction ranging from 1% to 90%, based on the ionic liquid (IL) and calculated as metal.

8. The filter material as claimed in claim 1, wherein the molar ratio of ionic liquid (IL) to metal "[ionic liquid (IL):metal]" lies in the range from [10:0.1] to [0.1:10].

9. The filter material as claimed in claim 1, wherein the activated carbon includes the metal-containing ionic liquid (IL) in amounts of 2 vol % to 60 vol %, based on the volume of the activated carbon.

10. The filter material as claimed in claim 1, wherein the activated carbon, with respect to the metal-containing ionic Liquid (IL), has a pore-filling degree α of 0.05 to 0.8.

11. The filter material as claimed in claim 1, wherein the pore-filling degree and the amount of metal-containing ionic liquid (IL) are determined such that 30% to 90% of the pore volume of the activated carbon is not filled with the metal-containing ionic liquid (IL).

12. The filter material as claimed in claim 1, wherein the activated carbon has particle sizes in the range from 0.01 to 1 mm.

13. The filter material as claimed in claim 1, wherein the support material is gas-permeable, wherein the support material has a gas-permeability in the range of from 10 l·m$^{-2}$·s$^{-1}$ to 20 000 l·m$^{-2}$·s$^{-1}$.

14. The filter material as claimed in claim 1, wherein the support material has a three-dimensional structure, wherein the support material is configured as a gas-permeable open-pore foam.

15. The filter material as claimed in claim 1, wherein the support material has a two-dimensional sheet-like structure, wherein the support material is configured as a gas-permeable textile fabric.

16. A method of producing a filter material as defined in claim 1,
wherein the method comprises the step of using an activated carbon provided with reactive or catalytic activity, wherein the activated carbon is provided with at least one metallic component, wherein the metallic component comprises at least one metal-containing ionic liquid (IL) and includes at least one metal compound dissolved or dissociated in the ionic liquid (IL), wherein the metal compound comprises at least one metal selected from the group consisting of Cu, Ag, Au, Zn, Hg, Sn, Ce, Ti, Zr, V, Nb, Cr, Mo, W, Mn, Fe, Ru, Os, Co, Rh, Ir, Ni, Pd and Pt, and wherein a multiplicity of discrete activated carbon particles in spherical or granular form is contacted with the metal-containing ionic liquid (IL);

wherein the activated carbon used as starting material has particle sizes in the range from 0.001 to 2 mm, as determined according to ASTM D2862-97/04, wherein the activated carbon has a total pore volume in the range from 0.7 to 2.5 cm$^3$/g, wherein 30% to 85% of the total pore volume of the activated carbon is formed by pores having pore diameters in the range from 2 nm to 50 nm and wherein the activated carbon has a specific BET surface area in the range from 500 m$^2$/g to 3,500 m$^2$/g;

wherein the ionic liquid (IL) is a compound of general formula [Kat]$^{n+}$[An]$^{n-}$ wherein "Kat" designates a cation and "An" designates an anion and "n" designates an integer equal to 1 or 2; or wherein the ionic liquid (IL) is a compound of general formula [Kat$_1$]$_x^{y+}$[An$_1$]$_y^{x-}$ wherein "Kat$_1$" designates a cation and "An$_1$" designates an anion and "x" and "y" each independently designate an integer from 1 to 4; wherein the cation of the ionic liquid (IL) is a nitrogen-containing cation selected from the group consisting of quaternary ammonium cations, imidazolium cations, pyridinium cations, pyrazolium cations and triazinium cations or a phosphorus-containing cation in the form of a phosphonium cation and wherein the anion of the ionic liquid (IL) is an organic or inorganic anion;

wherein the activated carbon includes the metal-containing ionic liquid (IL) in amounts of 1 vol % to 70 vol %, based on the volume of the activated carbon; or wherein the amount of metal-containing ionic liquid (IL), determined as the pore-filling degree, is such that 20% to 95% of the pore volume of the activated carbon is not filled with the metal-containing ionic liquid (IL);

wherein the pore-filling degree α is determined according to the formula [α=V$_{IL}$/(V$_{pore}$·m$_{support}$)] wherein "V$_{IL}$" designates the volume of the ionic liquid to be used, "m$_{support}$" designates the mass of the activated carbon to be used and "V$_{pore}$" designates the specific pore volume of the activated carbon; and wherein the activated carbon obtained in this way and provided with at least one metallic component is subsequently fixed onto a support material.

17. The method as claimed in claim 16, wherein the method comprises the following steps in the hereinbelow specified order (a) to (d):

(a) providing at least one metallic component based on a metal-containing ionic liquid (IL), wherein the metallic component includes at least one metal selected from the group of Cu, Ag, Au, Zn, Hg, Sn, Ce, Ti, Zr, V, Nb, Cr, Mo, W, Mn, Fe, Ru, Os, Co, Rh, Ir, Ni, Pd and Pt, wherein the at least one metal based on the metal compound is contacted with the ionic liquid (IL) and dissolved therein;

(b) contacting a multiplicity of discrete activated carbon particles in spherical or granular form with the metallic component obtained in step (a) on the basis of the metal-containing ionic liquid (IL);

(c) removing or separating off metal-containing ionic liquid (IL) not imbibed by the activated carbon or used in excess; and (d) fixing of the activated carbon provided with the at least one metallic, component onto a support material.

18. A method of using a filter material as claimed in claim 1 in the manufacture of protective materials in the form of protective apparel for the civilian or military sector and selected from protective suits, protective gloves, protective footwear, protective socks, protective headgear and protective coverings.

19. A method of cleaning or conditioning gases for removing undesirable, toxic, hazardous or environmentally harmful substances from gas-streams, wherein the gas stream to be cleaned or conditioned is contacted with a filter material as claimed in claim 1.

* * * * *